US012389197B2

(12) United States Patent
Viale et al.

(10) Patent No.: US 12,389,197 B2
(45) Date of Patent: *Aug. 12, 2025

(54) COLLABORATIVE SOCIAL DISTANCING

(71) Applicant: International Business Machines Corporation, Armonk, NY (US)

(72) Inventors: Joel Viale, Vence (FR); Frederic Bauchot, La Tourraque (FR); Zsolt Szalai, Tourrettes-sur-Loup (FR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 121 days.

This patent is subject to a terminal disclaimer.

(21) Appl. No.: 18/361,870

(22) Filed: Jul. 30, 2023

(65) Prior Publication Data
US 2023/0379658 A1 Nov. 23, 2023

Related U.S. Application Data

(63) Continuation of application No. 17/249,031, filed on Feb. 17, 2021, now Pat. No. 11,770,679.

(51) Int. Cl.
| H04W 4/00 | (2018.01) |
| G01C 21/34 | (2006.01) |
| G06F 8/61 | (2018.01) |
| H04W 4/02 | (2018.01) |
| H04W 4/024 | (2018.01) |

(52) U.S. Cl.
CPC ........ *H04W 4/024* (2018.02); *G01C 21/3453* (2013.01); *G06F 8/61* (2013.01); *H04W 4/023* (2013.01)

(58) Field of Classification Search
CPC .. H04W 4/024; H04W 4/023; G01C 21/3453; G06F 8/61
See application file for complete search history.

(56) References Cited

U.S. PATENT DOCUMENTS

| 10,055,967 | B1 | 8/2018 | Fields et al. |
| 11,022,453 | B2 | 6/2021 | Duquene et al. |
| 11,770,679 | B2 * | 9/2023 | Viale ............ H04W 4/024 |
| | | | 455/456.2 |
| 2014/0303885 | A1 | 10/2014 | Kamada et al. |
| 2018/0040037 | A1 | 2/2018 | Blair, II |

OTHER PUBLICATIONS

StopCovid app: five questions to understand the digital tracingapp; Franceinfo (France Televisions); May 26, 2020; 7 pages.
Holmes, Aaron; Singapore is using a high-tech surveillance app to trace the coronavirus, keeping schools and businesses open. Here's how it works; Business Insider; Mar. 24, 2020; 10 pages.

(Continued)

*Primary Examiner* — Erika A Washington
(74) *Attorney, Agent, or Firm* — Aaron Pontikos, Esq.; Heslin Rothenberg Farley & Mesiti P.C.; George S. Blasiak, Esq.

(57) ABSTRACT

Methods, computer program products, and systems are presented. The method computer program products, and systems can include, for instance: counting of crossings of a mobile client with one or more neighboring mobile client during performance of a trip.

20 Claims, 22 Drawing Sheets

(56) References Cited

OTHER PUBLICATIONS

Anonymous "*System and Method to Establish Security Walking Paths in a Epidemic Period*" IP.Com—IPCOM000263604D, Sep. 17, 2020.

Anonymous "*Method and System for Smart Contract Enabled Enforcement of Social Distancing in a Retail Store*" IP.Com—IPCOM000263850D, Oct. 9, 2020.

Anonymous "*Cognitive Route Determination for Pandemic-Contamination Avoidance*" IP.Com—IPCOM000262686D, Jun. 19, 2020.

Biswas, Debolina "*This Startup's Personal Safety App Will Help you Maintain Social Distancing During CoronaVirus*" YourStory Media, Pvt. Ltd.; May 9, 2020. *On current review and on information and belief, it is believe the citation was published prior to the filing date of the current application.*

Anonymous, "*Social Policy Identification and Behavior Conformity Awareness Rating*" IP.Com—IPCOM000263932D, Oct. 22, 2020.

Thakker, "*Smart Carts Get a Charge from Amazon and COVID-19*" Grocery Dive, https://www.grocerydive.com/news/smart-carts-get-a-charge-from-amazon-and-covid-19/583959/, Oct. 29, 2020.

Schouw, "*Go to Work, but Keep your Distance*" SoftwareAG.com., https://blog.softwareag.com/go-to-work-but-keep-your-distance, Oct. 29, 2020.

List of IBM Patent and/or Patent Applications treated as related for U.S. Appl. No. 18/361,870, filed Jul. 30, 2023, dated Aug. 16, 2023.

* cited by examiner

○ Group #1 with 75 commuters, Group #2 with 25 commuters

Learning Phase:

*th*=99 (SoDisCo not used)

*th*, $XE_{max}$, $XE_{total}$, $XE_{median}$     99, 38, 738, 6

○ Group #1 with 75 commuters, Group #2 with 25 commuters

Optimization Phase:

$th$=4 (Gain ~1:6)

| $th$, $XE_{max}$, $XE_{total}$, $XE_{median}$ | 4, 7, 120, 1 |

COLLABORATIVE SOCIAL DISTANCING

CROSS-REFERENCE TO RELATED APPLICATIONS

This application is a continuation of U.S. patent application Ser. No. 17/249,031, filed Feb. 17, 2021 (now issued as U.S. Pat. No. 11,770,679) entitled, "Collaborative Social Distancing" which is incorporated herein by reference in its entirety.

BACKGROUND

Location based services (LBS) are software services that use location data to control functionality of computer systems. LBS information services have a number of uses, e.g. in social networking, entertainment, security, and in a plurality of additional applications. LBS services employ location services for locating mobile computer systems. Location services can incorporate a variety of different locating service technologies such as the Global Positioning System (GPS), cellular network locating technologies, WI-FI based locating technologies, and other technologies. One example of an LBS is a location based messaging service wherein notifications and other messages to users can be in dependence on the respective locations of the users.

Data structures have been employed for improving operation of computer systems. A data structure refers to an organization of data in a computer environment for improved computer system operation. Data structure types include containers, lists, stacks, queues, tables and graphs. Data structures have been employed for improved computer system operation e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: receiving request data from a first mobile user equipment (UE) device, the request data requesting installation of an instance of a client software installation package on the first mobile UE device; and responsively to the request data from the first mobile UE device, deploying a first instance of the client software installation package to the first mobile UE device for installation on the first mobile UE device, wherein the client software installation package is configured so that when the client software installation package is installed on a respective mobile client, the respective mobile client is operative for (a) ascertaining that a trip has been declared by a respective mobile client user of the respective mobile client; (b) counting of crossings of the respective mobile client with one or more neighboring mobile client during performance of the trip; and (c) selecting a route for performance by the respective mobile client user in dependence on the counting of crossings.

In another aspect, a computer program product can be provided. The computer program product can include a computer readable storage medium readable by one or more processing circuit and storing instructions for execution by one or more processor for performing a method. The method can include, for example: receiving request data from a first mobile UE device, the request data requesting installation of an instance of a client software installation package on the first mobile UE device; and responsively to the request data from the first mobile UE device, deploying a first instance of the client software installation package to the first mobile UE device for installation on the first mobile UE device, wherein the client software installation package is configured so that when the client software installation package is installed on a respective mobile client, the respective mobile client is operative for (a) ascertaining that a trip has been declared by a respective mobile client user of the respective mobile client; (b) counting of crossings of the respective mobile client with one or more neighboring mobile client during performance of the trip; and (c) selecting a route for performance by the respective mobile client user in dependence on the counting of crossings.

In a further aspect, a system can be provided. The system can include, for example a memory. In addition, the system can include one or more processor in communication with the memory. Further, the system can include program instructions executable by the one or more processor via the memory to perform a method. The method can include, for example: receiving request data from a first mobile UE device, the request data requesting installation of an instance of a client software installation package on the first mobile UE device; and responsively to the request data from the first mobile UE device, deploying a first instance of the client software installation package to the first mobile UE device for installation on the first mobile UE device, wherein the client software installation package is configured so that when the client software installation package is installed on a respective mobile client, the respective mobile client is operative for (a) ascertaining that a trip has been declared by a respective mobile client user of the respective mobile client; (b) counting of crossings of the respective mobile client with one or more neighboring mobile client during performance of the trip; and (c) selecting a route for performance by the respective mobile client user in dependence on the counting of crossings.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
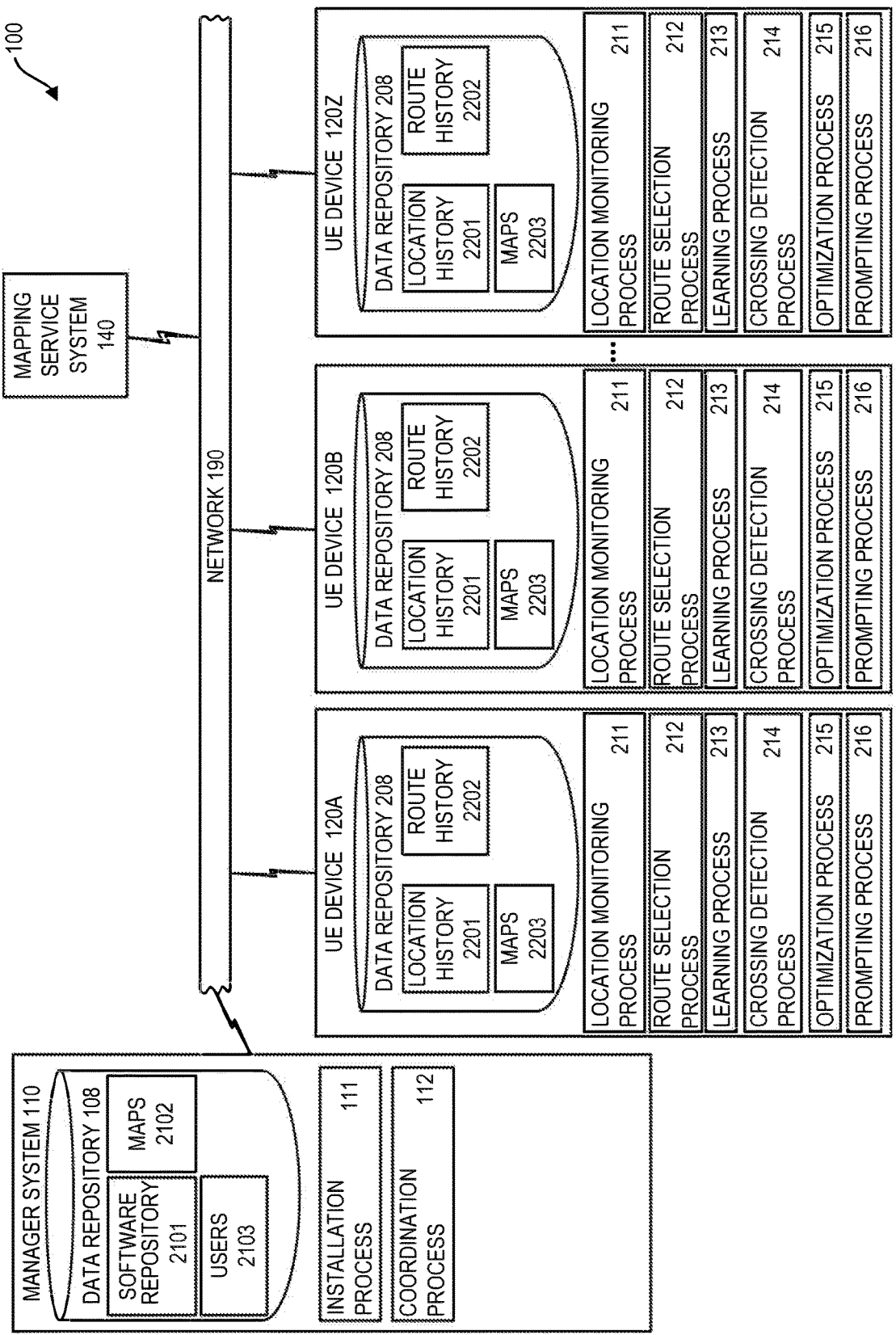
FIG. 1 depicts a system having a manager system, client computer devices, and an administrator client computer device according to one embodiment.

System 100 for use in guiding users to avoid crossing one another while traveling along routes is shown in FIG. 1. System 100 can include manager system 110 having an associated data repository 108, UE devices 120A-120Z, and mapping service system 140. Manager system 110, UE devices 120A-120Z, and mapping service system 140 can be in communication with one another via network 190. System 100 can include numerous devices which can be computing node based devices connected by network 190. A network can be a physical network and/or a virtual network. The physical network can be, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network.

In one embodiment, manager system 110 can be external to mapping service system 140 and to each of UE devices 120A-120Z. In one embodiment, manager system 110 can be collocated with one or more UE device of UE devices 120A-120Z. In one embodiment, manager system 110 can be collocated with mapping service system 140.

Each of the different UE devices 120A-120Z can be associated to a different user. A UE device of UE devices 120A-120Z can be a computing node device provided by a client computer, e.g., a mobile device, e.g., a smartphone or tablet, a laptop, smartwatch or PC that runs one or more program, e.g., to facilitate communication with services from external computing nodes, such as a web browser for access to web-based services. UE devices 120A-120Z can incorporate Global Positioning System (GPS) transceivers so that respective UE devices 120A-120Z are capable of reporting their current coordinate location at all times. UE devices 120A-120Z in addition or alternatively can be in communication with another locating service, e.g., cellular, wireless LAN-based, that facilitates reporting of a current location of UE devices 120A-120Z.

Mapping service system 140 can serve iteratively updated mapping data and can tag features of a map, including, e.g., roads, bodies of water, venues, and other infrastructure features. Road data can include tag data indicating road dimensions and whether the road can be navigated by foot, by vehicle, or both. For each feature, mapping service system 140 can associate, e.g., identifiers for the features, ranges of coordinate locations associated with the feature. Mapping service system 140, according to one embodiment, can be provided by GOOGLE MAPS® (GOOGLE MAPS® is a registered trademark of Google, Inc.).

Embodiments herein recognize that for avoiding the transmission of contagious diseases, users preferably will maintain substantial distance from one another, e.g., at least 6 feet or 2 meters when the respective users travel along routes. Embodiments herein can include prompting features to prompt users to travel on routes in which safe distance is encouraged between users and in which crossings are minimized or avoided all together. Crossings herein can refer to a situation in which first and second users pass one another within a threshold distance of one another, e.g., 6 feet or 2 meters. Embodiments herein recognize that a distributed processing system in which route planning decision making is performed at client computer UE devices protects the privacy of data and avoids system malfunctioning resulting from network failure.

According to one embodiment, UE devices 120A-120Z can respectively include certain common features. UE device 120A can include data repository 208 and can run processes 211 to 216. UE devices 120B-120Z can similarly include data repository 208 and can run processes 211 to 216. Data repository 208 in each of the different UE devices 120A-120Z can be associated to a different user. UE devices 120A-120Z can be computing node devices provided by e.g., client computers, mobile devices e.g., smart phones, laptops, tablets, or smartwatches. UE devices 120A-120Z can run one or more program, e.g., including a web browser program for opening and viewing web pages. Data repository 208 can include location history 2201 in which data repository 208 stores a history of locations of its respective UE device, e.g., UE device 120A in the described example. Data repository 208 in route history area 2202 can store history of routes traveled by its associated UE device. The historical route data can include e.g., trip data associated to routes and crossings associated to the various routes. The route data can include such data as a trip commencement location, destination location, and a set of user locations over time defining the path of a user when traveling the route. Data repository 208 can also include maps area 2203. Manager system 110 over time can iteratively send software installation package updates which include map data in respect to local geographical areas traveled by respective users.

Respective UE devices 120A-120Z can independently run instances of respective processes, such as processes 211-216. A UE device running location monitoring process 211 can monitor and record data specifying a current location of a user and the UE device over time and can store such data into location history area 2201 of data repository 208.

A UE device running route selection process 212 can run a routing algorithm to search a graph representing transport network for an optimized route between specified first and second nodes. The graph can use edges to represent road segments and nodes to represent intersections. In some embodiments, weightings such as distance, cost or accessibility may be associated with each edge, and sometimes with nodes. Identifying an optimized route within such a graph can be performed with use of one or more routing algorithm, e.g., Dijkstra's algorithm, Floyd-Warshall algorithm, Johnson's algorithm, A*, and the like. Dijkstra's algorithm can use a data structure for storing and querying partial solutions sorted by distance. Floyd-Warshall algorithm compares all possible paths through the graph between each pair of vertices. A UE device running route selection process 212 can identify best routes for a current trip based on alternative criterion, such as a first criterion and a second criterion. Applying a first criterion, a UE device can select a best route based on shortest distance (which can map to shortest time). Applying a second criterion, a UE device can select a best route based on a least turns criterion (most direct route). The first and second criterion are described further in reference to FIG. 5 herein.

A UE device running learning process 213 can learn information in respect to various routes being traveled by users. Such information can include e.g., crossing information. For detection of crossings, a UE device can run crossing detection process 214.

A UE device running crossing detection process 214 can detect events wherein a user crosses another user. A crossing event can be detected e.g., where a UE device of a first user and a UE device of a second user pass within a threshold distance of one another, e.g., 6 feet or 2 meters. For performance of crossing detection process 214, a UE device can utilize an output of a short-range radio transceiver respectively located on the respective UE devices of a certain user and a neighboring user, e.g., a Bluetooth radio transceiver. A short-range radio transceiver can be configured to detect radio transmissions of neighboring UE devices which also include respective short-range radio transceivers. A UE device running crossing detection process 214 can detect events wherein a certain UE device crosses a neighboring UE device by examination of a radiofrequency signal stream from the neighboring UE device without receipt of personal data from the neighboring UE device and without exchange of personal data between the certain UE device and the neighboring UE device. According to one embodiment, a certain UE device running crossing detection process 214 can include the certain UE device detecting crossing events without examination of a digital bitstream produced by demodulation of radiofrequency signal received from a neighboring UE device. In such an embodiment, the UE device can detect crossings by examination waveform amplitude of a received radiofrequency signal stream from a neighboring UE device examination of a digital bitstream produced by demodulation of radiofrequency signal received from a neighboring UE device. In some embodiments, a UE device for performance of crossing detection process 212 can be restricted from demodulating a received radio frequency signal stream from a neighboring UE device for performance of crossing detection so that users of system 100 have assurance that system 100 is operating without even the minimal information of radio address data being shared amongst users.

A UE device running optimization process 215 can optimize a selected route for use by a user. A UE device running optimization process 215 can select a current route for a user based on historical data of route history area 2202. According to one embodiment, a UE device running optimization process 214 can select a current route for user in dependence on crossings count data of historical routes used by a user.

A UE device running prompting process 216 can prompt a user to travel along selected current route for the user. A UE device running prompting process 216 can include the UE device displaying prompting data on a displayed user interface of the UE device to prompt a user to travel to a destination. The prompting data can include textual data and/or mapping data. The mapping data can include depictions of, e.g., streets including intersections being travelled, and landmarks, e.g., buildings and other geospatial features which may be encountered when a user follows prompts to travel according to a selected route. A UE device running prompting process 216 can include the UE device presenting audio prompting data through a speaker of the UE device to prompt a user to travel along selected current route for the user.

Referring to FIG. 1, the combination of location monitoring process 211, route selection process 212, learning process 213, crossing detection process 214 optimization process 215 and prompting process 216 can define an application which can be referred to herein as a social distancing collaboration (SDC) application 211-216. Software defining the combination of location monitoring process 211, route selection process 212, learning process 213, crossing detection process 214, optimization process 215 and prompting process 216 can be included within an installable software installation package for installation on respective ones of UE devices 120A as described in connection with the flowchart of FIG. 2 It will be understood that the installed software defining processes 211 to 216 need not include all software for performance of all functions described with reference to processes 211-216, but rather, software defining processes 211-216 can include calls to pre-existing and/or external services. For example, performance of route selection process 212 can include calls to local and/or external service applications running a routing algorithm. In some embodiments, SDC application 211-216 can have less than or greater than the elements set forth with respect to processes 211 to 216.

Instances of the described features of data repository 208 can be incorporated in respective data repositories 208 of remaining UE devices 120B-120Z. Described processes 211-216 run by a first UE device 120A can also be respectively run independently in respective ones of UE devices 120B-120Z.

Data repository 108 of manager system 110 can store various data. Data repository 108 in software repository area 2101 can store software installation package data for installation in respective ones of UE devices 120A-120Z, e.g., in response to received request data initiated by respective users of UE devices 120A-120Z. The software installation package data of software repository 208 when installed in respective ones of UE devices 120A-120Z can configure the respective UE devices 120A-120Z to participate in system 100. Software repository 208 can include distributed storage locations or a common storage location. The software installation package data of software repository 2101 when installed in respective ones of UE devices 120A-120Z can configure the respective UE devices 120A-120Z to include areas 2201, 2202, and 2203 as described in connection with data repository 208 and can configure the respective UE devices 120A-120Z to run the described processes 211-216. Data repository 108 in maps area 2102 can include maps regarding features associated to different geographical areas. From time to time, manager system 110 can receive updating mapping data from mapping service system 140 and can store such updated map data into maps area 2102.

Data repository 108 in users area 2103 can store data respecting users of system 100. In one embodiment, the user data of users area 2103 can include limited data and can be absent of data respecting the identification of users and be absent of personal identifying data of users in order to protect the privacy of the respective users. According to one embodiment, manager system 110, when registering a new user, can assign the new user a universally unique identifier (UUID) that is not associated to any identifying information of the user but may only, in one embodiment, be associated to a computing node address that permits manager system 110 to send software installation packages and software installation package updates to respective ones of UE devices 120A-120Z.

Manager system 110 running installation process 111 can respond to registration requests initiated by users of respective ones of UE devices 120A-120Z in order to send software installation packages to the respective UE devices 120A-120Z. A software installation package can include software installation package data stored in software repository 2101. A software installation package can include e.g., libraries and executable code facilitating the configuration of respective UE devices 120A-120Z so that the respective UE devices include data repository 208 having the attributes described herein and also configuring the respective UE devices 120A-120Z to run processes 211-216 as set forth herein. Manager system 110 running installation process 111 can also send software installation package updates to UE devices 120A-120Z, e.g., on a periodic or on-demand basis. A software installation package update can include e.g., new mapping data, updates to routing algorithms, updated parameter values controlling operation of processes 211-216, and the like. Manager system 110 running optional coordination process 112 can send communications to respective ones of UE devices 120A-120Z.

A method for performance by manager system 110 interoperating with UE devices 120A-120Z and a method for performance by respective ones of UE devices 120A-120Z are set forth with reference to the flowchart of FIG. 2. At respective blocks 1201, UE devices 120A-120Z can be sending respective instances of registration data for receipt for manager system 110.

Figure 3:
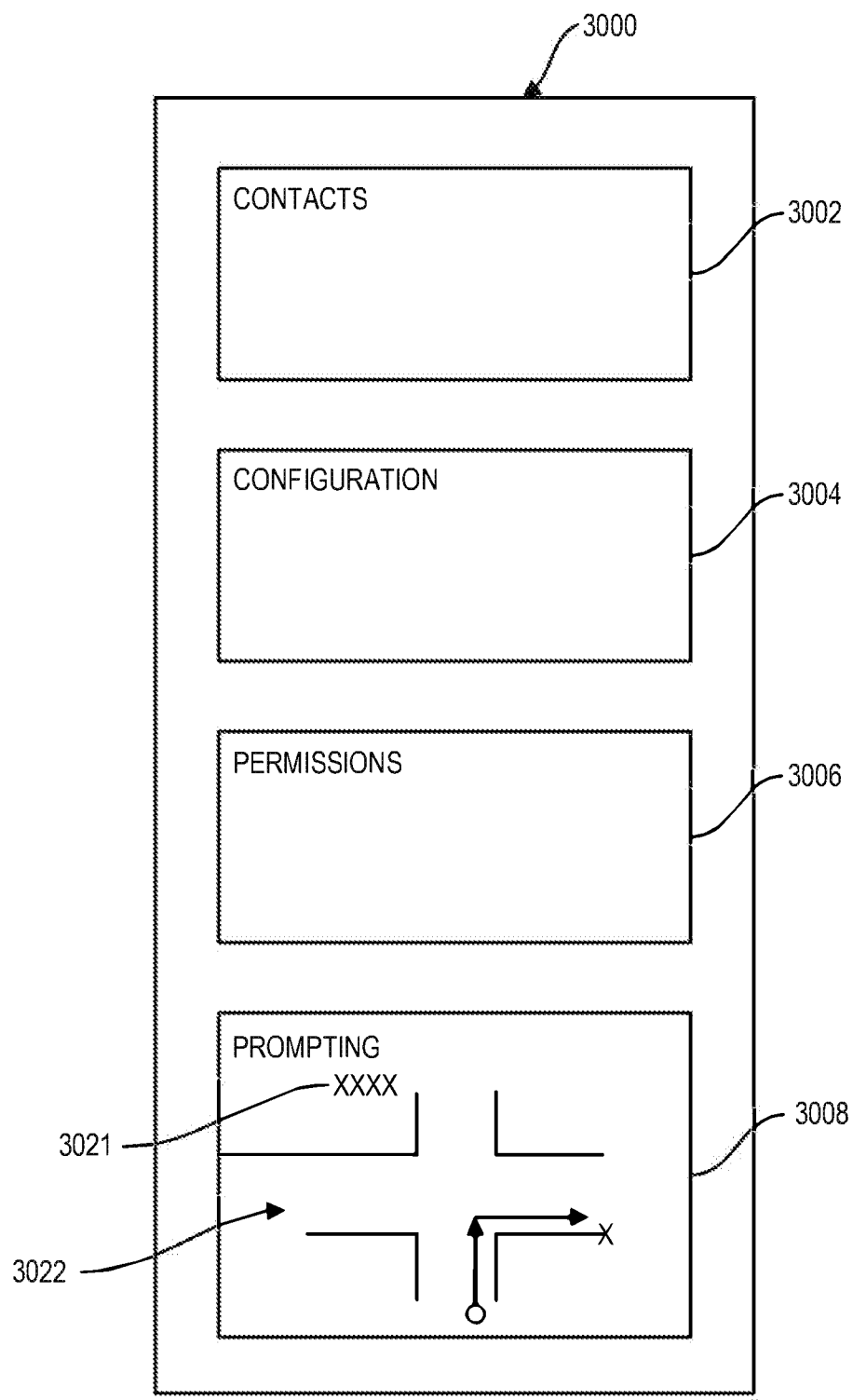
FIG. 3 depicts a displayed user interface for display on a display of a UE device according to one embodiment.

A displayed user interface 3000 for defining registration data by a user of a UE device is shown in FIG. 3. User interface 3000 can be displayed on a display of UE devices 120A-120Z. While contact data can be entered using area 3002, the contact data can be limited and some embodiments can be absent of any personal identifying data. In some embodiments, a user need not enter any data other than to register a minimal request for installation of a software installation package as set forth herein that permits participation in system 100. During a process of registration wherein a user of system 100 registers as a registered user of system 100, a user sending registration data can send with permission data defining the registration data a permission that grants access by manager system 110 to data of the user which can be designated to be limited data of the user or no data of the user. Entered registration data can include, e.g., name, address, social media account information, other contact information, biographical information, background information, preferences information, and/or permissions data e.g., can include permissions data allowing manager system 110 to query data of a social media account of a user including messaging system data and any other data of the user. When a user opts-in to register into system 100, manager system 110 can inform the user as to what data is collected and why, that any collected personal data may be encrypted, that the user can opt out at any time, and that if the user opts out, any personal data of the user is deleted.

Embodiments herein feature distributed processing whereon subsequent to installation of instances of a software installation package on respective local client computers provided by UE devices 120A to 120Z, processing can be performed at the respective UE devices rather than at a centralized location by manager system 110. The distributed architecture can improve performance and can avoid centralized collection of user data in order to protect user privacy.

In configuration area 3004, a user can enter configuration data that defines aspects of the operation of the user device of the user, e.g., prompting attributes, crossing sensitivity attributes, timing of updates and the like. In permissions area 3006 of displayed user interface 3000, a user can enter data specifying permissions of a user, e.g., permissions for use of location, data of a user, social media account information of a user, biometric data of a user and the like.

In prompting area 3008, user interface 3000 can display prompting data, e.g., prompting data that prompts the user to travel in compliance with a selected route for the user. Prompting data can include text based prompting data 3021 and/or graphics based prompting data 3022 for prompting a user to travel along a selected route. Graphics based prompting data can include e.g., depictions of a commencement and destination location, depictions of infrastructure, e.g., roads, sidewalks, buildings, arrows to depict a direction of travel, and the like. Prompting data additionally or alternatively can include audio based prompting data presented on a UE device being prompted to travel along a selected route.

In response to receipt of the registration data sent at blocks 1201, manager system 110 at block 1101 can store the received registration data into users area 2103 of data repository 108. In response to receipt of the registration data sent at blocks 1201 which can define a request for a software installation package, manager system 110 at blocks 1102, 1103 and 1104, can send and deploy software installation packages for installation on respective ones of UE devices 120A to 120Z. The software installation packages can include appropriate software, e.g., libraries and executable code that enable respective UE devices to participate in the operation of system 100. The instances of software installation packages sent at blocks 1102, 1103 and 1104 can be installed at install block 1202 performed by respective ones of UE devices 120A to 120Z. There is set forth herein responsively to request data from UE device 120A (sent at block 1201), deploying (block 1102) a first instance of the client software installation package to a first mobile UE device for installation on the first mobile UE device, wherein the client software installation package is configured so that when the client software installation package is installed on a respective mobile client, the respective mobile client is operative for (a) ascertaining that a trip has been declared by a respective mobile client user of the respective mobile client; (b) counting of crossings of the respective mobile client with one or more neighboring mobile client during performance of the trip; and (c) selecting a route for performance by the respective mobile client user in dependence on the counting of crossings. In response to completion of block 1104, manager system 110 can proceed to return block 1105. At return block 1105, manager system 110 can return to a stage preceding block 1101 to receive updated registration data from UE device 120A-120Z which might be defined by respective users of UE devices 120A-120Z. Manager system 110 throughout its deployment can iteratively perform the loop of blocks 1101-1105 to iteratively receive and store updates to registration data and to iteratively send for deployment software installation package updates.

Referring again to FIG. 1, the software installation packages can enable respective ones of UE devices 120A to 120Z to store data described in reference to data repository 208 as set forth in connection with FIG. 1. The software installation packages can enable respective ones of UE devices 120A to 120Z and to run various processes, such as processes 211 to 216 described in reference to FIG. 1.

With its respective software installation package instance installed, UE device 120A can proceed to block 1203 to record current location of UE device 120A into data repository 208 of UE device and store coordinate location data defining the current location of UE device 120A into location history area 2201 of data repository 208.

For acquisition and storage of current coordinate location data, UE device 120A, like remaining ones of UE devices 120B to 120Z, can include, e.g., a global positioning system (GPS) sensor, which facilitates the sensing and output of coordinate location data based on signals received from orbiting satellites. UE device 120A performing record location block 1203 can include UE device 120A activating location monitoring process 211 as described in connection with FIG. 1. The performance of record location block 1203 can be iterative and can be ongoing throughout the deployment period of UE device 120A after the described software installation package is installed to block 1202. With record location block 1203 being performed on an ongoing basis, UE device 120A can proceed to block 1204.

At block 1204, UE device 120A can ascertain whether a trip has been declared. According to one embodiment, the user can declare a trip using displayed user interface 3000 as shown in FIG. 3, which can be displayed on a display of UE device 120A. For declaring a trip, the user can use prompting area 3008 of user interface 3000 (FIG. 3) to specify at least a destination location, e.g., within a geospatial map associated to a current location of the user displayed on UE device 120A.

A trip can be defined by a user specifying at least the destination location and, in some instance, a destination location and a commencement location. The locations can be coordinate locations. A trip herein can refer to a plan by a user to travel from a commencement location to a destination location and a trip can be defined by its commencement location and its destination location. User interface 3000 can be configured to allow a user, e.g., in prompting area 3008, to specify at least a destination location, and in some instances, a commencement location and a destination location. Where a user for specifying a trip specifies only a destination location but does not expressly specify a commencement location, a UE device can use a current location of the user as determined by performing record location block 1203 as the commencement location for a trip.

UE device 120A, if a trip has been declared at block 1204, can proceed to block 1205. At block 1205, UE device 120A can select a route for the declared trip declared at block 1204. In performing block 1205, UE device 120A can ascertain by examining data of data repository 208 whether the user has previously performed a trip having commencement and destination locations in common with the trip declared at block 1204. If the user has not previously performed an historical trip having commencement and destination locations in common with a currently declared trip, UE device 120A at block 1205 can select a route for the trip based on an output of route selection process 212, in which a selected route can be selected based on shortest distance (first criterion as explained with reference to route selection process 212), which can be dependent on distance between a commencement location and a destination location. Route selection based on route selection process 212 can result in the selection of a route that is the shortest path between two points and can be independent of a social distancing criterion as described in connection with optimization process 215.

In response to completion of block 1205, UE device 120A can proceed to block to 1206. At block 1206, UE device 120A can perform prompting to prompt the user to travel along a selected route for the declared trip selected at block 1205. The prompting can include displaying data in prompting area 3008 of displayed user interface 3000 as described in FIG. 3. The prompting can additionally or alternatively present audio prompting data on UE device 120A. The prompting can take the form, e.g., of displaying a map in prompting area 3008 of user interface and highlighting streets or other paths which the user should take to execute the selected route. In response to completion of block 1206, UE device 120A can proceed to block 1207.

At block 1207, UE device 120A can detect crossings of the user of UE device 120A while the user performs the selected route of the specified trip. UE device 120A can detect crossings at block 1207 using an output from a short range radio transceiver of UE device 120A, e.g., a Bluetooth radio transceiver.

A short range radio transceiver, e.g., Bluetooth, can pick up radio transmissions from neighboring short range radio transceivers of neighboring devices such as neighboring devices 120B to 120Z. UE device 120A can ascertain the distance between itself and a neighboring device based on a strength of signal from a neighboring received by a short range radio transceiver of the UE device. Signal strength of radio signals transmitted between neighboring UE devices can be expected to be inversely proportional to a distance between the UE devices. Stronger than baseline power signals can be expected to be received from closer ranged UE devices within a threshold distance, and weaker than baseline power signal can be expected to be received from longer ranged UE devices that are beyond the threshold distance. UE device 120A can determine that a crossing has occurred when UE device 120A detects that another device based on receipt of a short range radio signal satisfying a power amplitude threshold received from the neighboring device has achieved a location that is less than the threshold distance, e.g., six feet, or two meters, from UE device 120A. When a crossing is detected at block 1207, UE device 120A can increment a crossing detection counter for a current trip. UE device 120A can increment a crossing detection counter for each crossing detected for a current trip. For performance of crossing detection, UE device 120A can utilize an output of a short-range radio transceiver respectively located in UE device 120A, e.g., a Bluetooth radio transceiver which picks up a radiofrequency signal stream emitted by a short range transceiver of a neighboring UE device of UE devices 120B-120Z. A short-range radio transceiver of UE device 120A can be configured to detect radio transmissions of neighboring UE devices which also include respective short-range radio transceivers. A UE device 120A running crossing detection process 214 can detect events wherein UE device 120A carried by a mobile user crosses a neighboring UE device 120B-120Z by examination of a radiofrequency signal stream from the neighboring UE device 120B-120Z without receipt of personal data from the neighboring UE device 120B-120Z and without exchange of personal data between the certain UE device and the neighboring UE device 120B-120Z.

According to one embodiment, UE device 120A for performance of crossing detection can include UE device 120A detecting crossing events without examination of a digital bitstream produced by demodulation of radiofrequency signal received from a neighboring UE device 120B-120Z. In such an embodiment, the UE device 120A can detect crossings by examination waveform amplitude of a received radiofrequency signal stream from a neighboring UE device 120B-120Z without examination of a digital bitstream produced by demodulation of radiofrequency signal received from a neighboring UE device 120B-120Z. In some embodiments, UE device 120A for performance of crossing detection can be restricted from demodulating a received radio frequency signal stream from a neighboring UE device 120B-120Z so that users of system 100 have assurance that system 100 is operating without even the minimal information of radio address data being shared amongst users.

At block 1208, UE device 120A can adjust a current route associated to a current trip of a user associated to UE device 120A in dependence on detected crossings as recorded in a crossing counter updated at block 1207. UE device 120A can be configured so that when a number of crossings satisfies (e.g. equals or exceeds) a threshold, th, UE device 120A can adjust a current route. When UE device 120A adjusts a current route for a trip, UE device 120A can select a remainder route for a remainder of a trip from a current intermediate trip location of the UE device to the trip's destination location.

UE device 120A can be configured so that when a number of crossings for a current route has satisfied the threshold, UE device 120A at block 1208 can adjust the current route. When adjusting a route, UE device 120A can activate route selection process 212 to select a remaining route from a current location within the current trip to a destination associated to the current trip. Location data herein can take the form of coordinate location data. As described in connection with block 1205, UE device 120A for selecting an initial route for a trip can select a best route according to a first criterion. At block 1208, UE device 120A for selecting an adjusted route for a trip can select a best route according to a second criterion different from the first criterion. In one embodiment, the first criterion can be a shortest distance criterion and the second criterion can be a least turns (most direct route) criterion. In one embodiment, the first criterion can be a shortest time criterion and the second criterion can be a least turns (most direct route) criterion. In one embodiment, the first criterion can be a least turns (most direct route) criterion and the second criterion can be a shortest distance or shortest time criterion.

UE device 120A adjusting a current trip's route at block 1208 can reactivate the route selection process 212 as described in FIG. 1 to select a best performing route based on a second criterion (e.g., least turns), which can be dependent on distance between a now current location at the time of performance (at the time of performance of block 1208) to the destination location specified at block 1204. The selected remaining route for the remaining portion of the current trip selected at block 1208 from the trip intermediate current location to the destination location can be the best alternative route for the remainder of the trip destination selected using a criterion differentiated from an applied criterion for selection of a trip's initial route selected at block 1205. In such manner, UE device 120A can be configured to adaptively discover and prompt for the performance of alterations of the current trip's route responsively to detection of a threshold satisfying number of crossings during performance of the current trip's route.

In response to completion of block 1208, UE device 120A can proceed to block 1209. At block 1209, UE device 120A can determine whether a destination has been reached. The destination determined to be reached at block 1209 can be the destination specified by the user referred to in block 1204, which is the destination of the current trip. When UE device 120A ascertains at block 1209 a current coordinate location of UE device 120A being carried by the user matching the coordinate location data the destination specified in the trip definition, the destination can be regarded to be achieved.

In the case that UE device 120A determines that the destination has not been reached, UE device 120A can loop back to a stage prior to prompting block 1206 and can iteratively perform a next iteration of blocks 1206 to 1209 so that prompting continues to occur and further so that crossings continue to be detected in a manner that an active route may be iteratively adjusted if the threshold number of crossings is satisfied.

In one embodiment, UE device 120A can be configured to re-set the crossing counter to zero each time the trip route is adjusted responsively to the crossings threshold, th, being satisfied. UE device 120A can iteratively perform the loop of blocks 1206 to 1209 until UE device 120A at block 1209 determines that a destination has been reached. UE device 120A can determine that a destination has been reached when a coordinate location of the UE device 120A matches a coordinate location of declared destination location determined to be declared at block 1204.

In the case that the destination has been reached, UE device 120A can proceed to block 1210 to log trip data for the trip and route just completed and store such trip data into route history area 2202 of data repository 208 of UE device 120A.

TABLE A

| Trip ID | Commencement and destination locations | Route | Beginning time | Ending time | Number of crossings |
|---|---|---|---|---|---|
| AAA001 | Commencement location: A Destination location: Z | A-J-C-Z | XX | XX | XX |
| AAA011 | Commencement location: A Destination location: Z | A-J-N-Z | XX | XX | XX |
| AAA013 | Commencement location: A | A-J-S-Q-Z | XX | XX | XX |

TABLE A-continued

| Trip ID | Commencement and destination locations | Route | Beginning time | Ending time | Number of crossings |
|---|---|---|---|---|---|
| AAA020 | Destination location: Z Commencement location: A Destination location: Z | A-J-X-Z | XX | XX | XX |
| AAA021 | Commencement location: A Destination location: Z | A-J-N-Z | XX | XX | XX |

Table A depicts a plurality of differentiated routes, each associated to an historical trip having the commencement location A and the destination location Z. The recorded routes for the various trips having common commencement and destination locations can be unaltered routes (which have remained the same from the time of the trip declaration), or altered routes (which have adapted as a result of a number of detected crossings having satisfied a crossings threshold).

At block 1211, UE device 120A can optionally send reporting data to manager system 110 for storage by manager system 110 in users area 2103 in data repository 108 for use by manager system 110 in the performance of coordination process 112 by manager system 110. When storing data at block 1210 as described in Table A on completion of a trip, UE device 120A can store as recorded trips the overall trip just completed mapping to the commencement locations and destination locations declared at the prior iteration on block 1204, as well as partial trips. For example, the trip having the route A-J-X-Z with the commencement and destination locations A and Z and detected crossings associated to the route A-J-X-Z can be recorded separately as the trip having the route J-X-Z with the commencement and destination locations J and Z and crossings associated to the route J-X-Z, and as the trip having the route X-Z with the commencement and destination locations X and Z and detected crossings associated to the route X-Z. In the described manner, UE device 120A is more likely to identify at block 1205 historical trips having commencement and destination locations matching those of a currently declared trip.

The reporting data can include, e.g., the data of Table A for each trip performed by UE device 120A, and/or updates to the Table A data so that manager system 110 stores a complete history of trips of all users of system 100. While UE device 120A optionally can send reporting data at block 1211 which potentially can be used by system 100, the distributed computing system is capable of operating to reduce crossings without the sending of reporting data and without any UE device of UE device 120A-120Z using any information derived from data received from any remaining UE device.

In response to completion of block 1211 (if implemented), UE device 120A can return to a stage prior to block 1204 and can iteratively perform the loop of blocks 1204-1211 for a deployment period of UE device 120A. At block 1204 and 1205, for each iteration of block 1204 and block 1205, UE device 120A can ascertain whether an historical trip having a commencement and destination locations matching a currently declared trip has been previously performed by a user and can ascertain whether the number of historical trips of the user having commencement and destination locations matching the currently declared trip determined to be declared at block 1204 satisfies a trip count threshold, Tth. UE device 120A can be configured so that if UE device 120A has previously performed trips having commencement and destination locations matching those of a currently declared trip a trip threshold satisfying (Tth) number of times, UE device 120A can activate optimization process 215 to apply a social distancing criterion and select an initial route for the declared trip determined to be declared at block 1204 in dependence on historical crossings data.

With optimization process 215 activated, UE device 120A can select a route for the trip in accordance with a social distancing criterion. When optimization process 215 is activated, UE device 120A can select a route for the declared trip in dependence detected crossings of historical routes for historical trips having commencement and destination locations matching the currently declared trip. When optimization process 215 is activated, UE device 120A can select as the initial route for the declared trip the historical route for historical trips having commencement and destination locations matching those of the declared trip that produced the lowest aggregate (e.g., average) number of detected crossings. Thus, referring to the historical trip data of table A for the trip A-Z, UE device 120A can select the route A-J-N-Z in the case that route A-J-N-Z produced the lowest aggregate, e.g., average number of crossings for historical trips having commencement and destination locations matching commencement and destination locations of the currently declared trip. The trip threshold value, Tth, can be, e.g., user selectable, or system selectable, by manager system 110.

Figure 2:
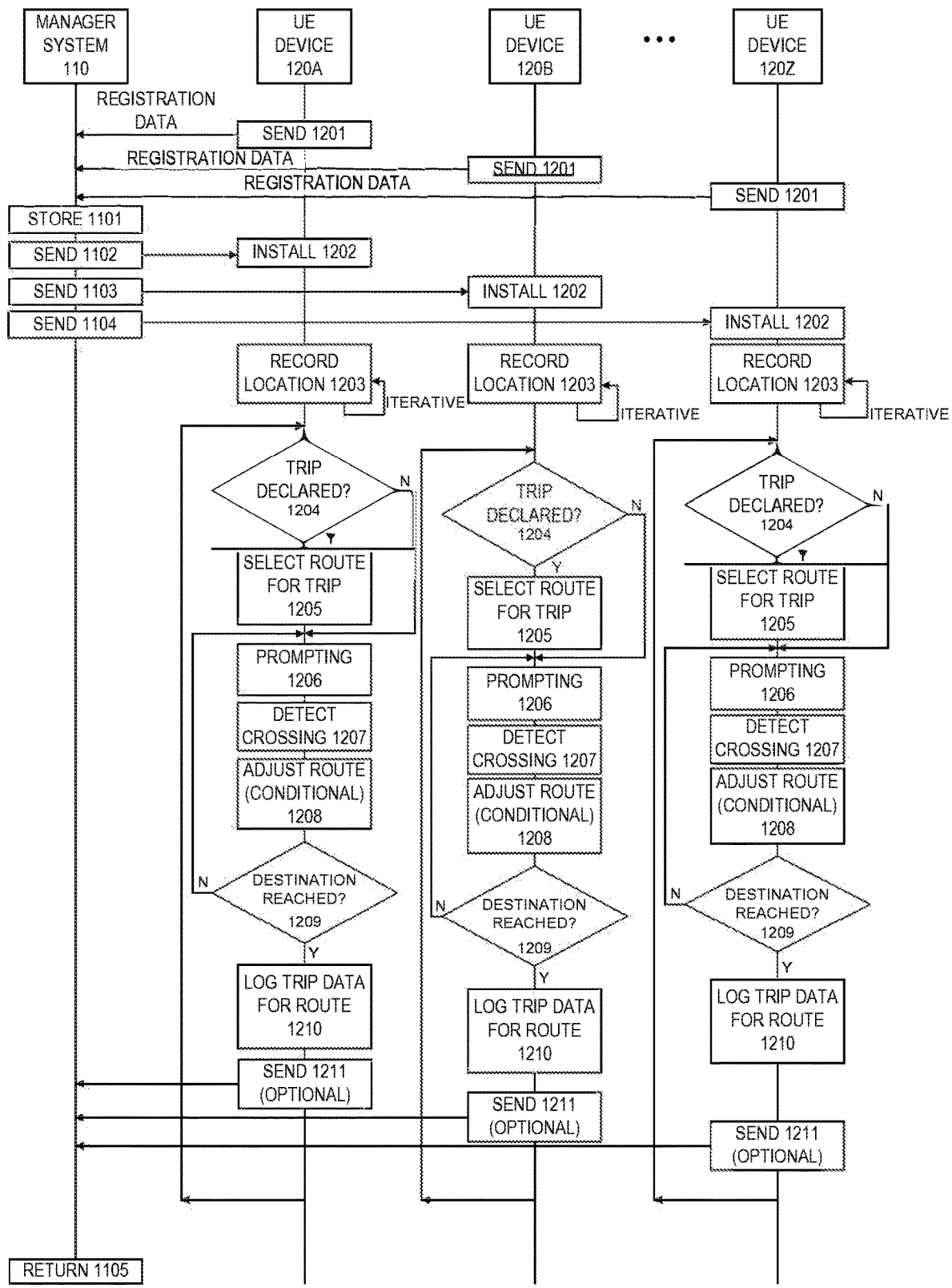
FIG. 2 is a flowchart illustrating a method for performance by a manager system and a method for performance by respective UE devices according to one embodiment.

Referring to the flowchart of FIG. 2, UE devices 120B-120Z can contemporaneously but asynchronously and independently be performing the loop of blocks 1204-1211 based on location data generated by respective movements of their users while UE device 120A performs the loop of blocks 1204-1200. UE devices 120A-120Z can independently and separately (a) permit their respective user to declare a trip, (b) establish a route for the declared trip, (c) detect crossings associated to a route and trip, (d) alter a current route in response to collected crossings data, (e) prompt their respective user to travel a selected route, and (f) select a route in dependence on historical crossing data.

Figure 4:
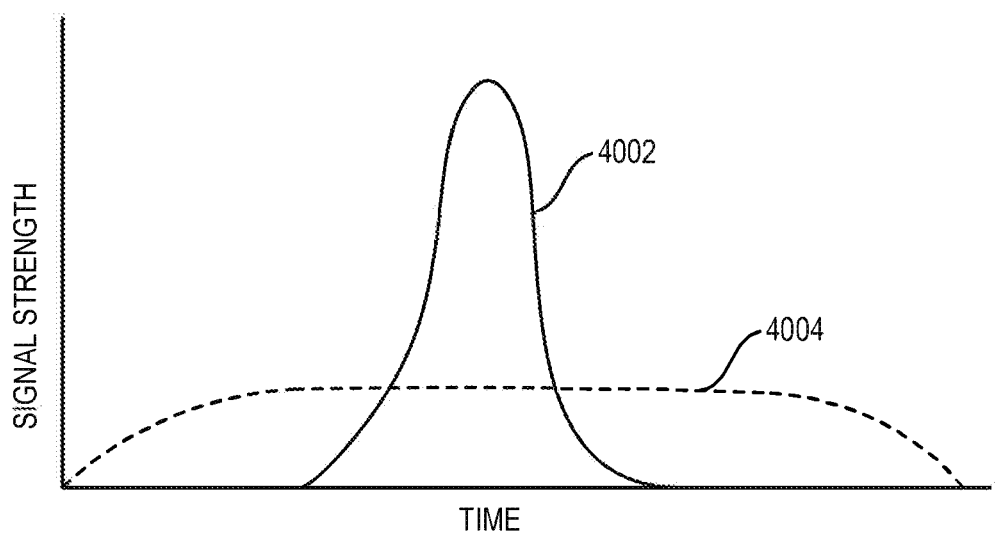
FIG. 4 is a signal diagram illustrating respective signals associated to an opposite direction crossing and a common direction crossing according to one embodiment.

Referring again to crossing detection block 1207, UE device 120A, in some embodiments, can ascertain whether a detected crossing is an opposite direction processing or a common direction crossing. An opposite direction crossing can occur when first and second users cross while traveling in opposite directions. A common direction crossing can occur when first and second users cross while traveling in a common direction. That is, a second user can be walking or otherwise traveling at a higher rate of speed that a first user, and therefore can overtake the first user over time. UE device 120A, according to one embodiment, can detect whether crossing is an opposite direction crossing or a common direction crossing. FIG. 4 sets forth representative power amplitude signal patterns associated to an opposite direction crossing and a common direction crossing. Signal pattern 4002 can be representative of an opposite direction crossing and signal pattern 4004 can be representative of a common direction crossing. A power amplitude signal associated to an opposite direction crossing can be characterized generally by a shorter overall duration and a higher maximum signal strength while a power amplitude signal associated to a common direction crossing can be characterized by a longer overall duration and a lower maximum signal strength. UE device 120A can be configured to classify incoming crossing indicating amplitude signals as being either opposite direction crossing classified or common direction crossing classified. For performance of such classification, UE device 120A can apply curve fitting and least-squares methodologies to match an incoming signal with one of the representative signals depicted in FIG. 4. According to another methodology, heuristic data samples can be collected, including amplitude signal samples derived by opposite signals crossings and common direction crossings. Simulated data from a simulated environment can be utilized. The sample data can subject to K means analysis in order to identify clusters associated, respectively, to an opposite direction crossing and a common direction crossing. Trained predictive models can be installed as part of the software installation packages installed at blocks 1202 and incoming samples collected live by a UE device 120A at block 1207, using one or more of such trained predictive models, can then be associated to one or the other cluster based on lowest Euclidian distance for classification. The functions described as being performed by UE device 120A with respect to the flowchart can be performed asynchronously and independently by respective ones of UE devices 120B-120Z.

Embodiments herein recognize that in some environments, common direction crossings may be more easily avoided by a user than opposite direction crossings, e.g., by modifying travel speed, and or by the visual identification of lateral spacing by first and second users traveling in a common direction. Accordingly, UE device 120A, in some embodiments, can assign values to detected common direction crossings in a manner differently than opposite direction crossings. In one example, UE device 120A can filter out detected crossings that are classified as common direction crossings from the overall count of crossings so that such crossings are not counted as crossing. In another example, UE device 120A can assign values to classified common direction crossings that are a percentage value of the values assigned to classified opposite direction crossings. For example, UE device 120A can assign opposite direction crossings the value of 1 and can assign common direction crossings the value of 0.5 or another value less than 1.

Embodiments herein recognize that in the presence of a pandemic or other conditions, commuters in an environment, e.g., a city should maximize social distancing, even during the rush hours where many commuters are present, e.g., all the people commuting from their home to the nearest train station, in the morning, and from the nearest train station to their homes in the evening. Embodiments herein recognize that commuters remain nevertheless concerned about privacy and often refuse solutions fed with geolocalization data, with central data repository owned by authorities. Embodiments herein recognize that in order to maximize physical distancing, it can be more efficient to avoid people crossing each other in opposite direction and rather favor people walking in the same direction. Embodiments herein propose a system enforcing physical distancing, in some embodiments without any central repository (i.e. fully distributed) and without exchanging localization information.

Embodiments herein recognize that commuters typically have a mobile UE device such as a smartphone or the like. These UE devices can have an installed software installation package defining the described SDC application 211-216 leveraging the following: Short Range Communications (SRC) capabilities (e.g. Bluetooth). Mobile UE devices can include a positioning and navigating system where the user can specify the target location to reach, so that the possible routes can be identified. According to one embodiment, priority can be given first to the shortest route (and shortest time), and second to the most direct route (least turns). In the following, the proposed solution will be described in the context of a downtown city with blocks separated by streets and avenues.

Figure 5:
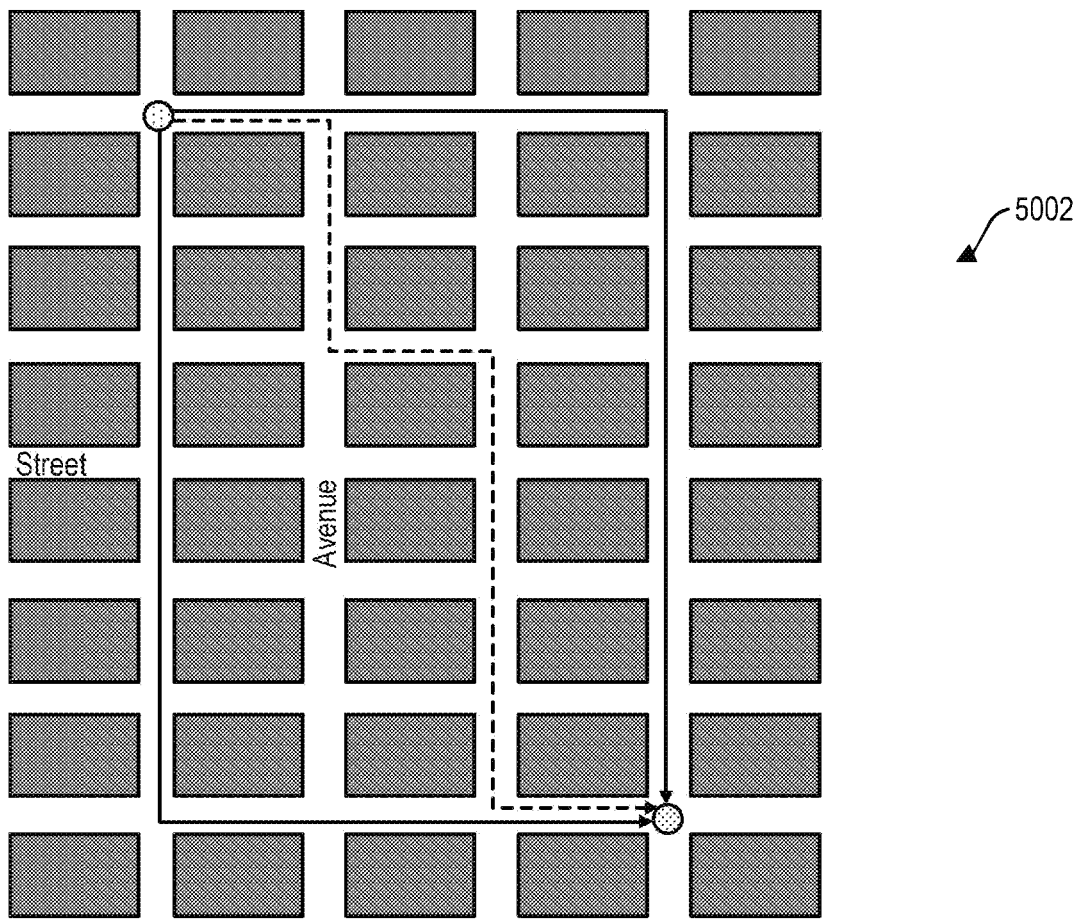
FIG. 5 depicts a road grid that may be traversed by multiple independently operating UE devices associated to respective different users according to one embodiment.

Aspects of system 100 set forth herein are described in reference to FIG. 5 depicting a city block (grid) 5002 having streets and avenues. A user of a UE device 120A can use the UE device 120A to specify a trip having a beginning location, e.g., home location, and ending location, e.g., target location. Running route selection process 212, UE device 120A can select a route using routing algorithm software that selects a route according to a first criterion by shortest distance (dashed line) and according to a second criterion by least turns (solid lines, the most direct route). Thus, referring to FIG. 1, a UE device 120A running route selection process 212, according to one embodiment, can select the dashed line route as the best route and select the solid line route as the best alternate route.

Operation of UE device 120A can be described in terms of a learning phase and an optimization phase. According to a learning phase, (a) when commencing his/her journey, a commuter user can specify his/her target destination location on user interface 3000 (FIG. 2). Responsively (b), the UE device 120A running route selection process 212 can identify a best route (shortest or least turns), can (randomly) select one of them, and can guide the commuter user along it by presenting prompting data on user interface 3000. With a user of the UE device 120A walking on a street or avenue according to the prompting data, UE device 120A (c) can count the number of other UE devices 120B-120Z crossing within range of a short range communication system of UE device 120A (no data exchanged), called «Xing Events». When reaching a street/avenue intersection, if the Xing Event count is below a predefined crossing threshold, th, nothing is done, the commuter user continues his/her journey along the current route. Otherwise (d), UE device 120A can notify the commuter user to take the best alternate route, if found available, and resets the count. When the target destination location is reached, UE device 120A (e) can record various route data including the followed performed route and the total number of Xing Events. These data can be locally stored in data repository 208 of each UE device 120A-120Z.

According to an optimization phase (f), when a predefined trip threshold (Tth) satisfying number of routes have been recorded sharing the same commencement location and destination location, and similar beginning time, UE device 120A can compute the average number of Xing Events for each followed route and identifies the «Optimal Route» with the lowest number of Xing Event. When the commuter commences his/her journey, the previous crossing count process of the learning phase is followed, with UE device 120A selecting for initial route of a declared trip, the historically travelled route having commencement and destination locations and beginning time according to the declared trip having the lowest aggregate (e.g. average) number of crossings.

Embodiments herein recognize that when many commuter users follow the above scenario, they collaboratively build a system where the pedestrian traffic in a given street or avenue is mainly going one way (e.g. 90% north vs 10% south). Doing so, the occurrence of crossing between people moving in opposite directions is greatly reduced, thus improving physical distancing. Embodiments herein can provide a solution that is fully dynamic, so that the same avenue can be mainly used to the north in the morning and to the south in the evening.

Figure 6:
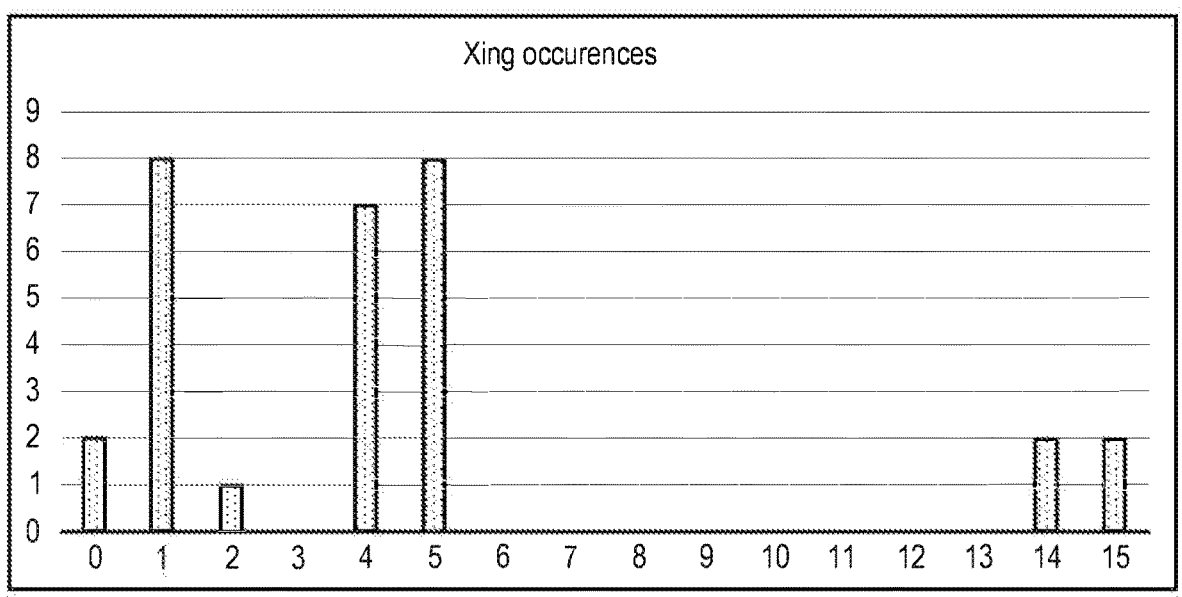
FIG. 6 illustrates crossing event data of a first variation of a first simulation according to one embodiment.
Figure 7:
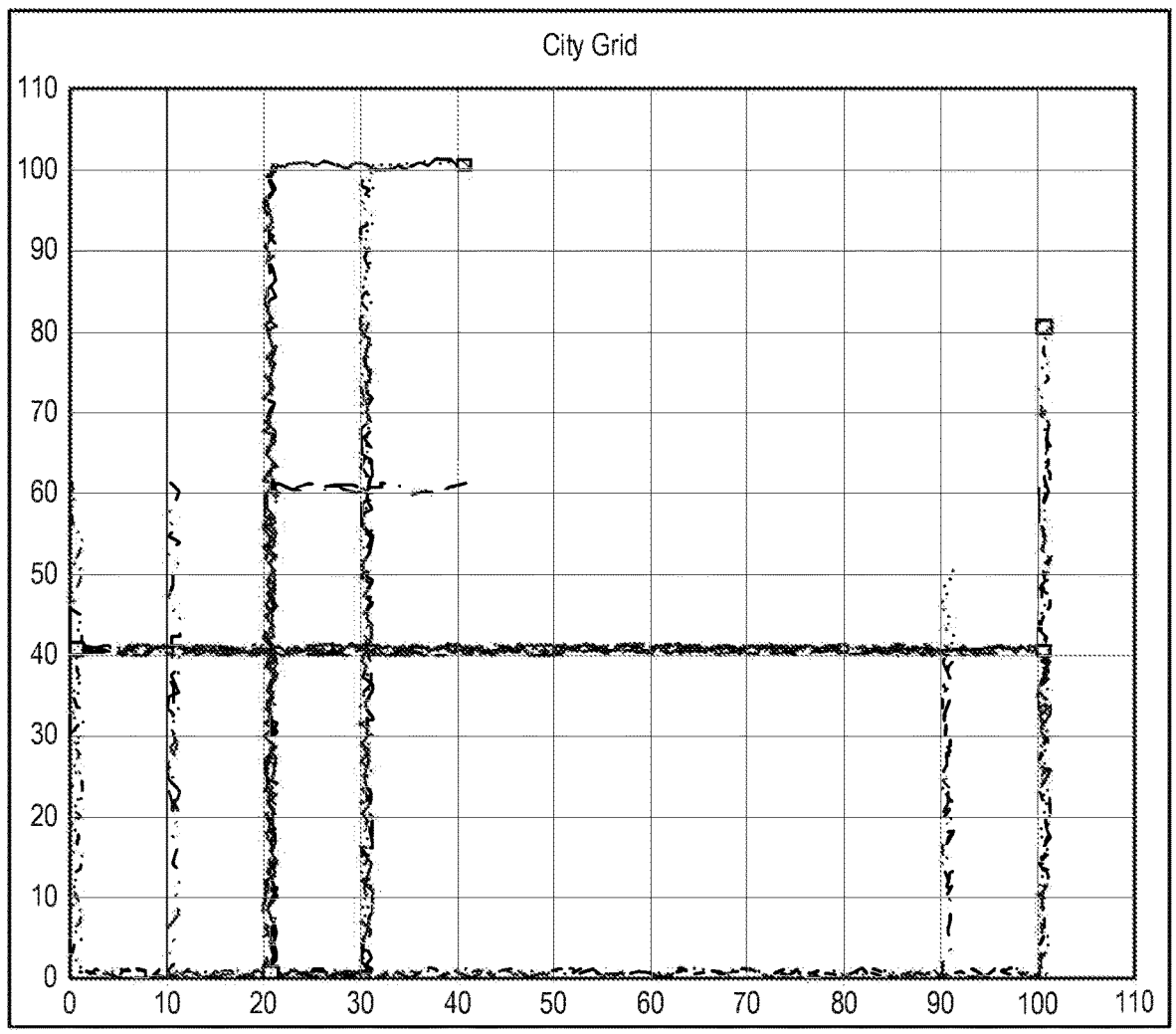
FIG. 7 depicts user traffic associated to the simulation variation referenced in FIG. 6 according to one embodiment.

FIGS. 6 to 15 illustrate a first simulation in which simulated users traveling through the city grid generally is depicted in FIG. 5. The simulation of FIGS. 6 to 15, with multiple variations can feature a grid of 10 roads and 10 avenues and 100 simultaneous commuter user. Simulation variations can be provided with different crossing threshold values for use in triggering route alterations within a trip. Parameters depicted in the drawings with respect to the simulations described herein can include: th, the crossing threshold used for triggering route alterations within a trip, XEmax, the maximum number of crossings observed for any simulated user during a simulated trip, XEtotal, the total number of crossings for the simulation involving multiple user making respective trips, and XEmedian, the median number of crossings for a simulated user during a simulated trip of the simulation. In the simulation depicted with reference to FIG. 6-15, various parameters are adjusted so that the impact of the various parameters can be observed. FIG. 6 illustrates crossing events in the variation of the first simulation in which learning phase features as set forth herein are not active. That is, in the simulation variation depicted in FIG. 6, user routes are not adjusted in dependence on a number of crossing events having satisfied a crossing threshold. As shown in FIG. 6, a significant number of crossings are observed. FIG. 7 illustrates a traffic pattern corresponding to the data of FIG. 6.

Figure 8:
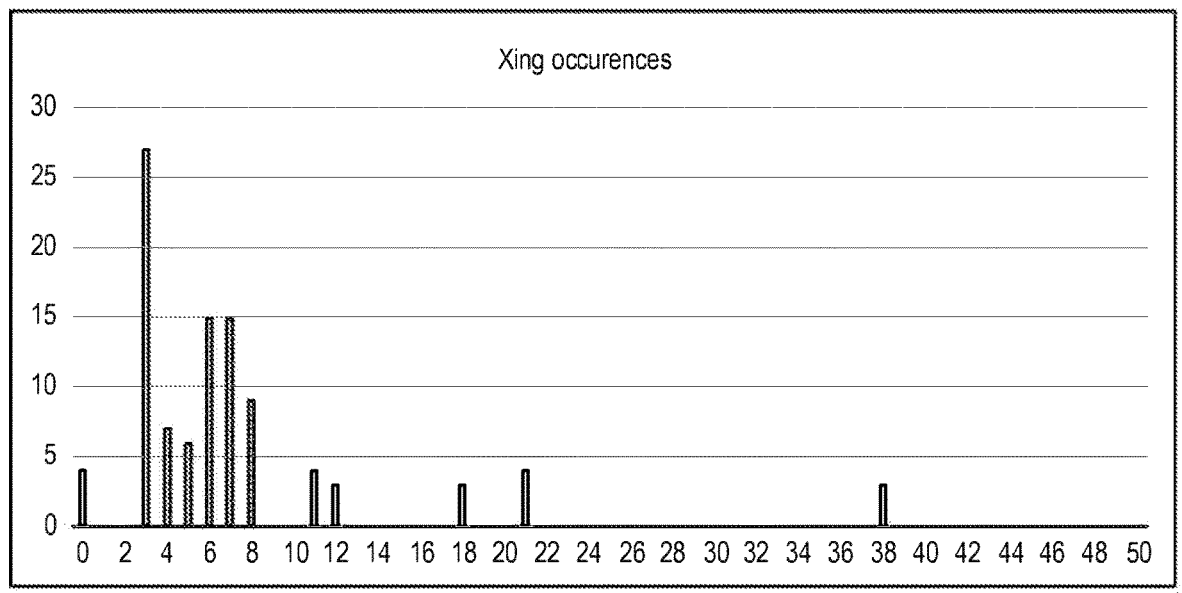
FIG. 8 illustrates crossing event data of a second variation of a first simulation according to one embodiment.
Figure 9:
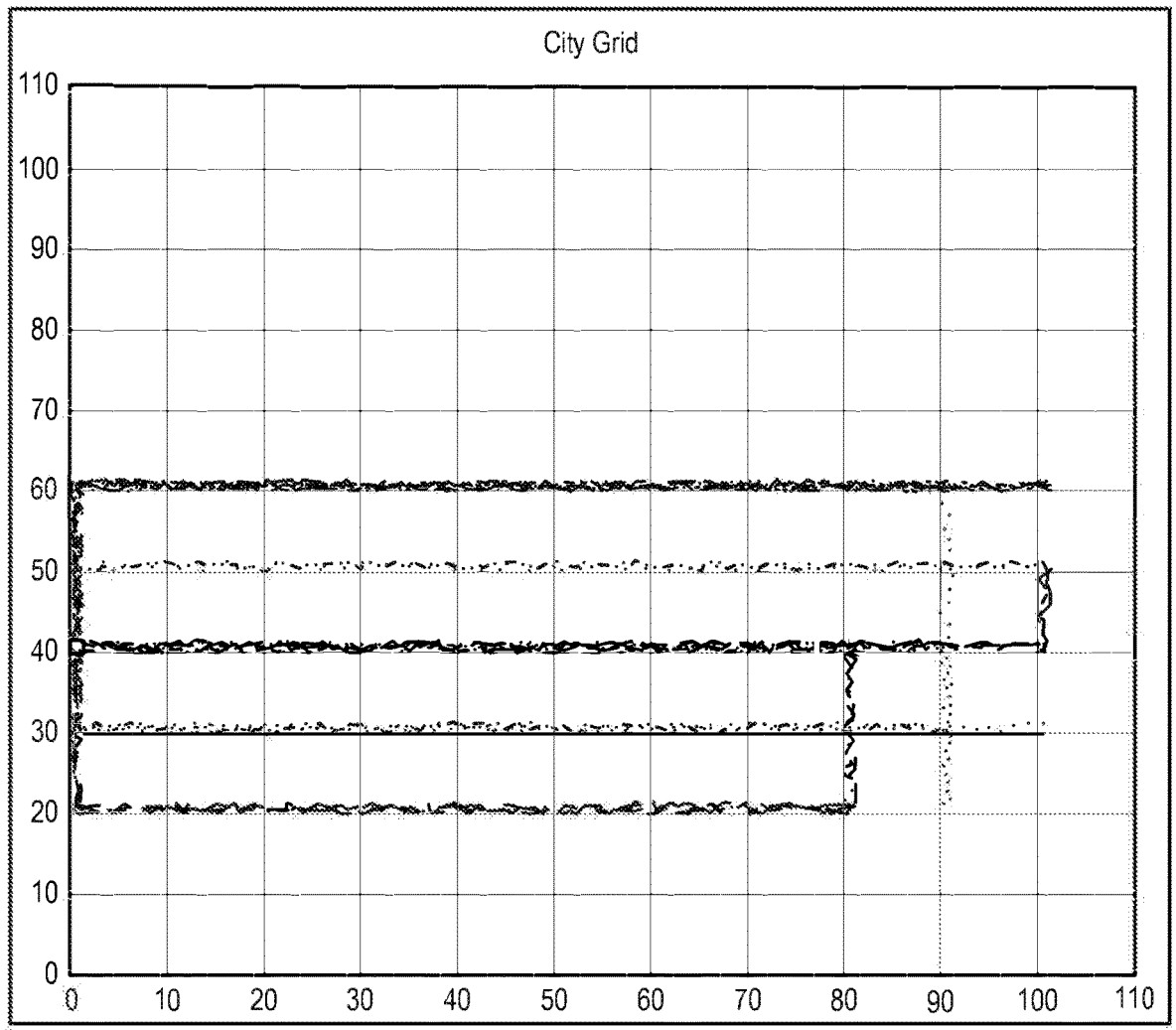
FIG. 9 depicts user traffic associated to the simulation variation referenced in FIG. 8 according to one embodiment.

FIG. 8 illustrates a variation of the simulation as shown in FIG. 6, where there are first and second groups of commuter users simulated. The first group of users, comprising 75 community users can travel generally in an east-west direction and the second group of users simulated can travel generally in a west to east direction. In the simulation variation depicted in FIG. 8, learning phase features are deactivated by turning the crossing threshold parameter value, th, to a large value that will not be observed. In the simulation variation of FIG. 8, 738 crossing events are observed with the maximum number of crossing events for any given simulated user being 38, and the median number of crossings for each user being 6. FIG. 9 illustrates traffic pattern corresponding to the simulation data of FIG. 8.

Figure 10:
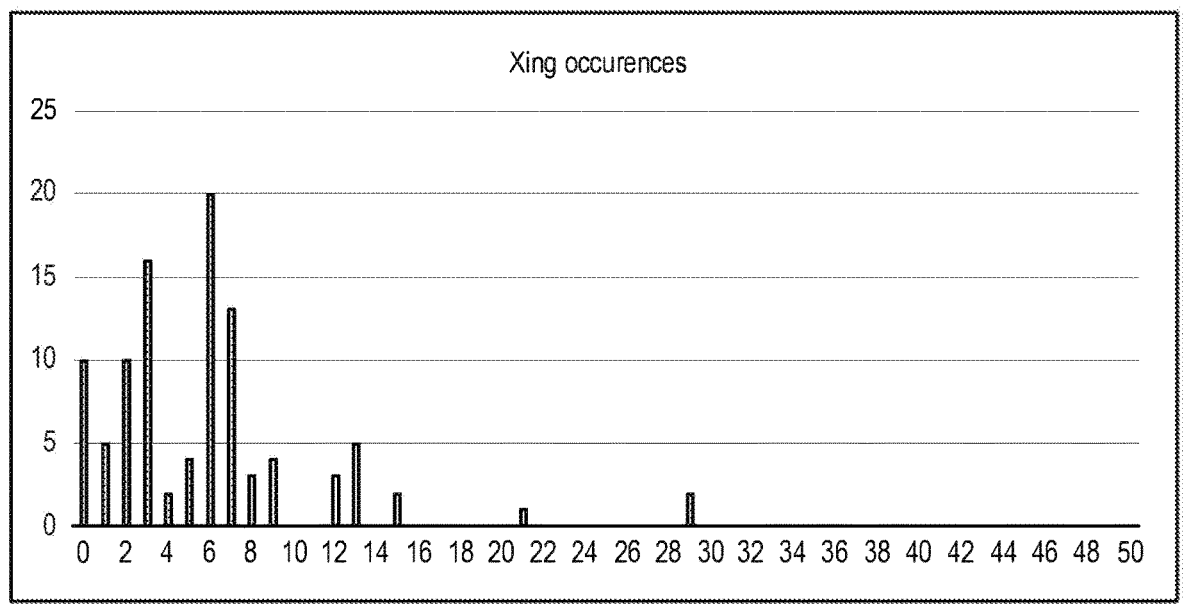
FIG. 10 illustrates crossing event data of a third variation of a first simulation according to one embodiment.
Figure 11:
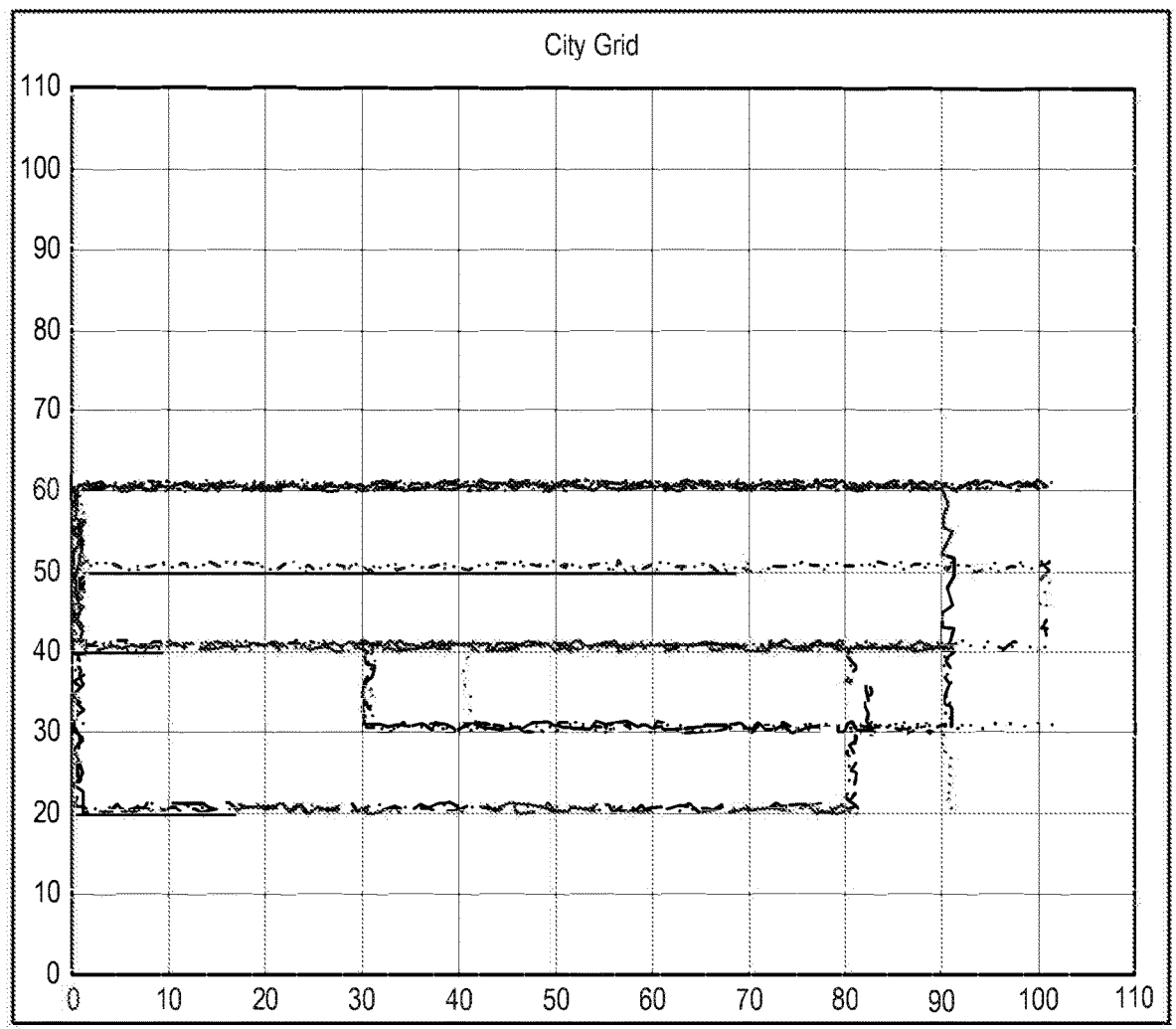
FIG. 11 depicts user traffic associated to the simulation variation referenced in FIG. 10 according to one embodiment.

FIG. 10 depicts simulation data in a simulation variation in which the crossing threshold value, th, is set to th=8 so that selected and prompted-for routes of respective users can be adjusted mid trip based on a number of detected crossings satisfying the crossing threshold th=8. In the simulation variation depicted in FIG. 10, optimization features are not active. That is, initially selected routes for respective users are not selected according to a route of an historical trip sharing commencement and destination locations with a declared trip featuring the lowest aggregate (e.g., average) number of crossings. FIG. 10 depicts that the introduction of a learning phase with the crossing threshold th=8 provides an improvement relative to the simulation variation of FIG. 8. The number of crossings detected drops from 738 to 582 for a gain of about 1.25. FIG. 11 illustrates traffic distribution corresponding to the simulation data of FIG. 10.

Figure 12:
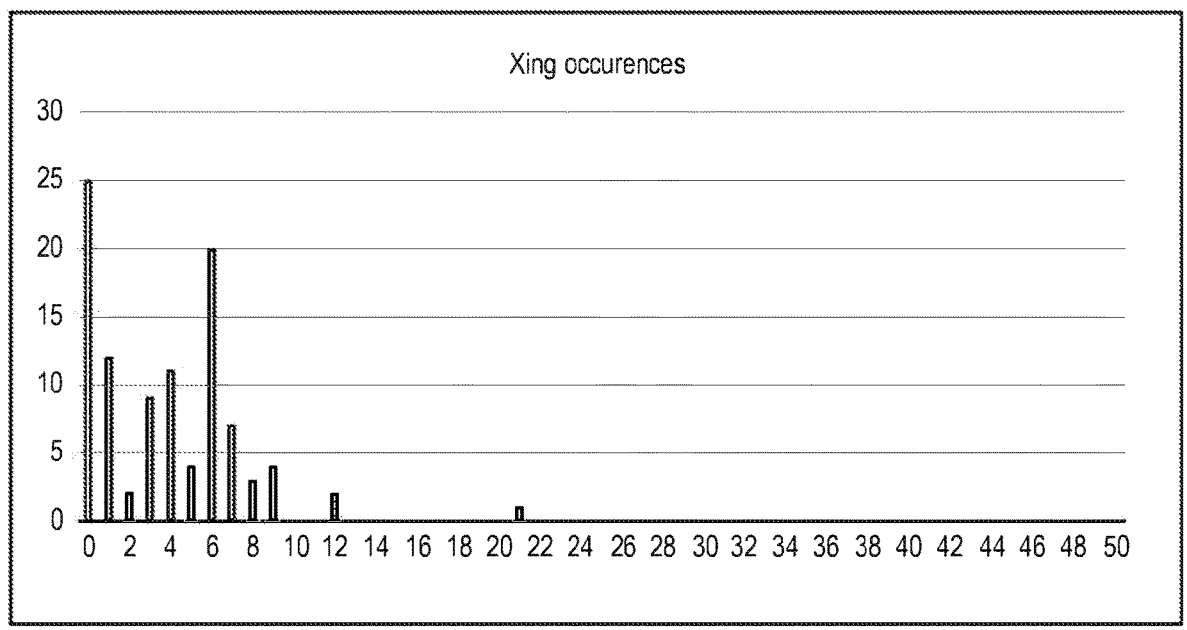
FIG. 12 illustrates crossing event data of a fourth variation of a first simulation according to one embodiment.
Figure 13:
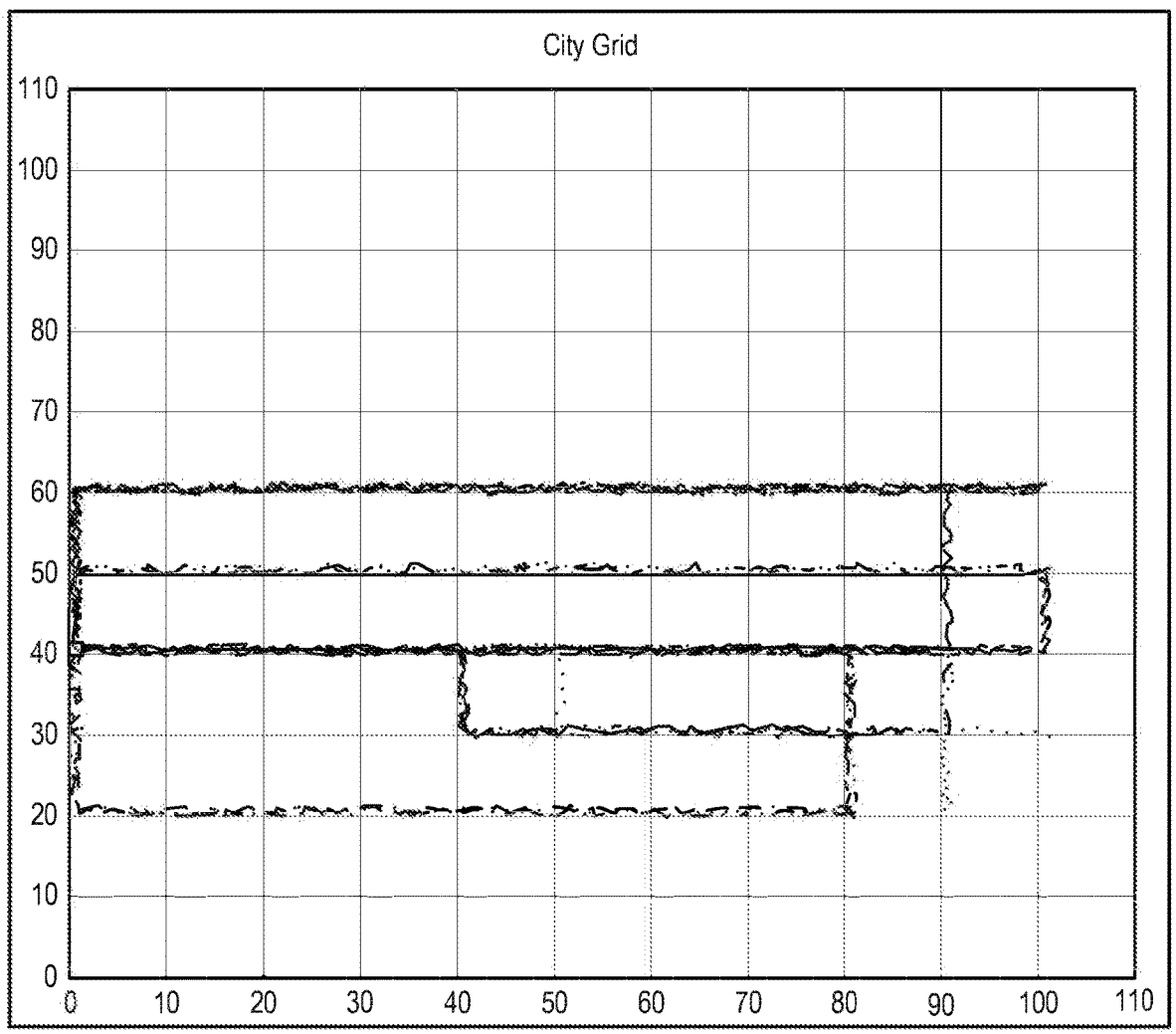
FIG. 13 depicts user traffic associated to the simulation variation referenced in FIG. 12 according to one embodiment.

In the simulation variation of FIG. 12, the optimization phase continues to be inactive, but the crossing threshold value th is reduced to th=4 so that route adjustment of users in the respective travels is more sensitive to the detection of crossings during a current trip. Referring to FIG. 12, the total number of crossings is reduced to 381 for an overall gain of about 2. FIG. 13 illustrates a traffic pattern according to the simulation variation summarized in FIG. 12.

Figure 14:
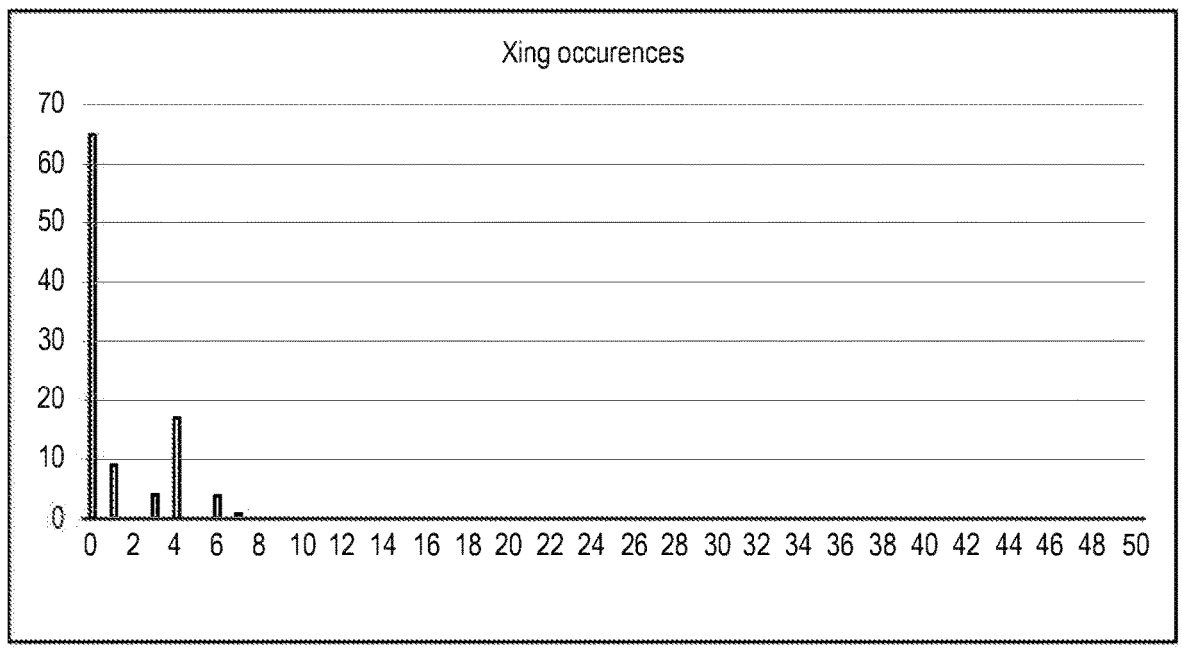
FIG. 14 illustrates crossing event data of a fifth variation of a first simulation according to one embodiment.
Figure 15:
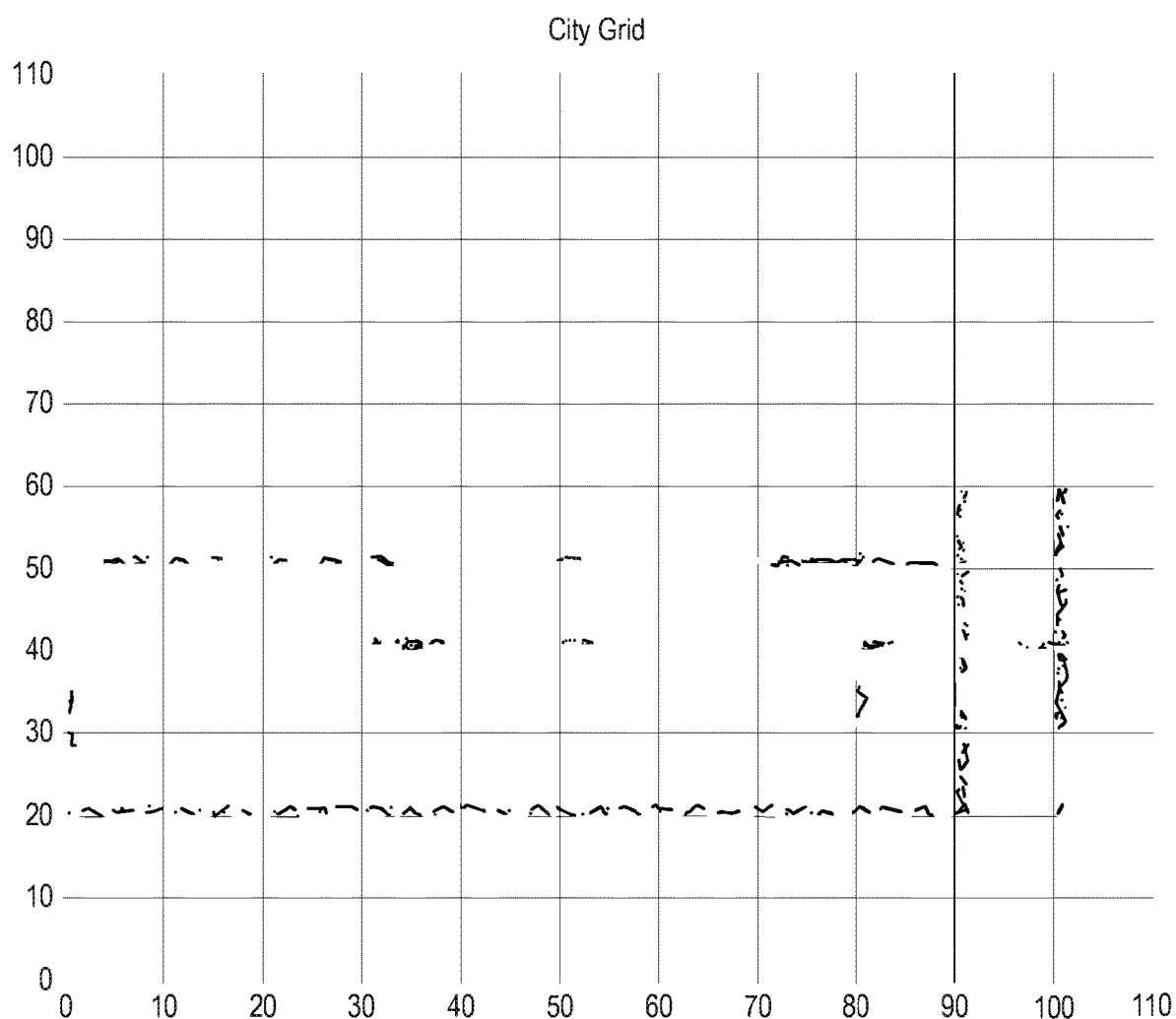
FIG. 15 depicts user traffic associated to the simulation variation referenced in FIG. 14 according to one embodiment.

The simulation variation depicted in FIG. 14 illustrates the impact of including an optimization phase with respect to the simulation described in reference to FIG. 6. With an optimization phase implemented, UE device 120A can select an initial route for user according to the historical trip of the user matching commencement and destination locations for a declared trip that has lowest aggregate (e.g., average) number of associated crossings. Substantial improvement is observed. With the implementation of an optimization phase, the total number of observed crossings is reduced to a value of 120, which defines an overall gain of about 6. In the simulation variation depicted in FIG. 14, a majority of commuter users are able to make their respective trips without incurring any crossing with another user. FIG. 15 depicts traffic pattern data corresponding the simulation variation of FIG. 14.

Another simulation is described with reference to FIGS. 16 to 19. In the simulation variation of FIG. 16, the learning phase and optimization phase features as set forth herein are not implemented and a significant number of crossings are observed. The total number of crossings observed is 1004. The maximal number of crossings for any given user is 34, and the median number of crossings for the respective users is 10.

Figure 17:
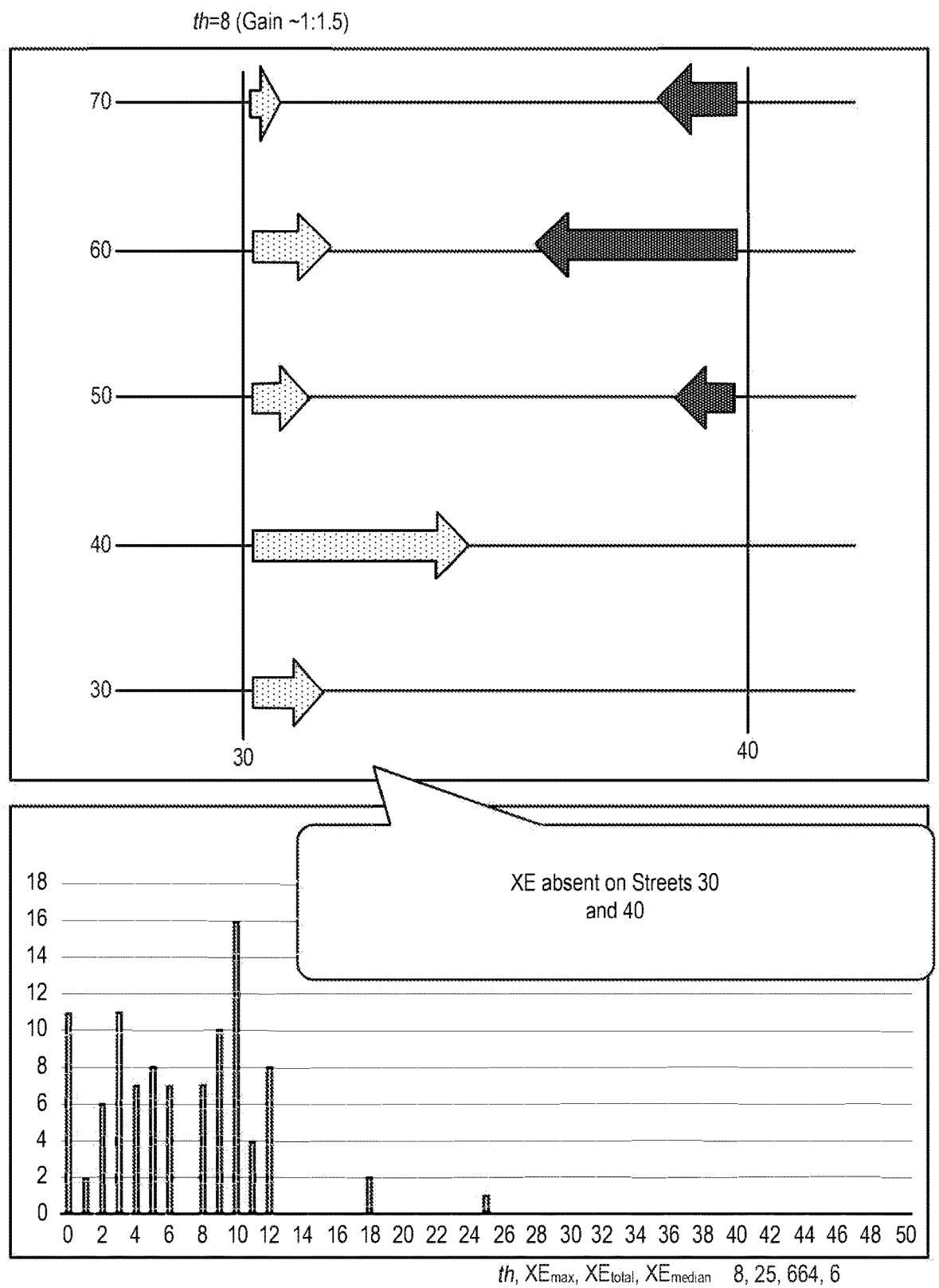
FIG. 17 illustrates crossing event data and user traffic of a second variation of a second simulation according to one embodiment.

In the simulation variation depicted with reference to FIG. 17, learning phase features are implemented with the crossing threshold value set to th=8. Significant improvement is observed with the total number of crossings observed being reduced from 1004 to 664 for a gain of about 1.5.

Figure 18:
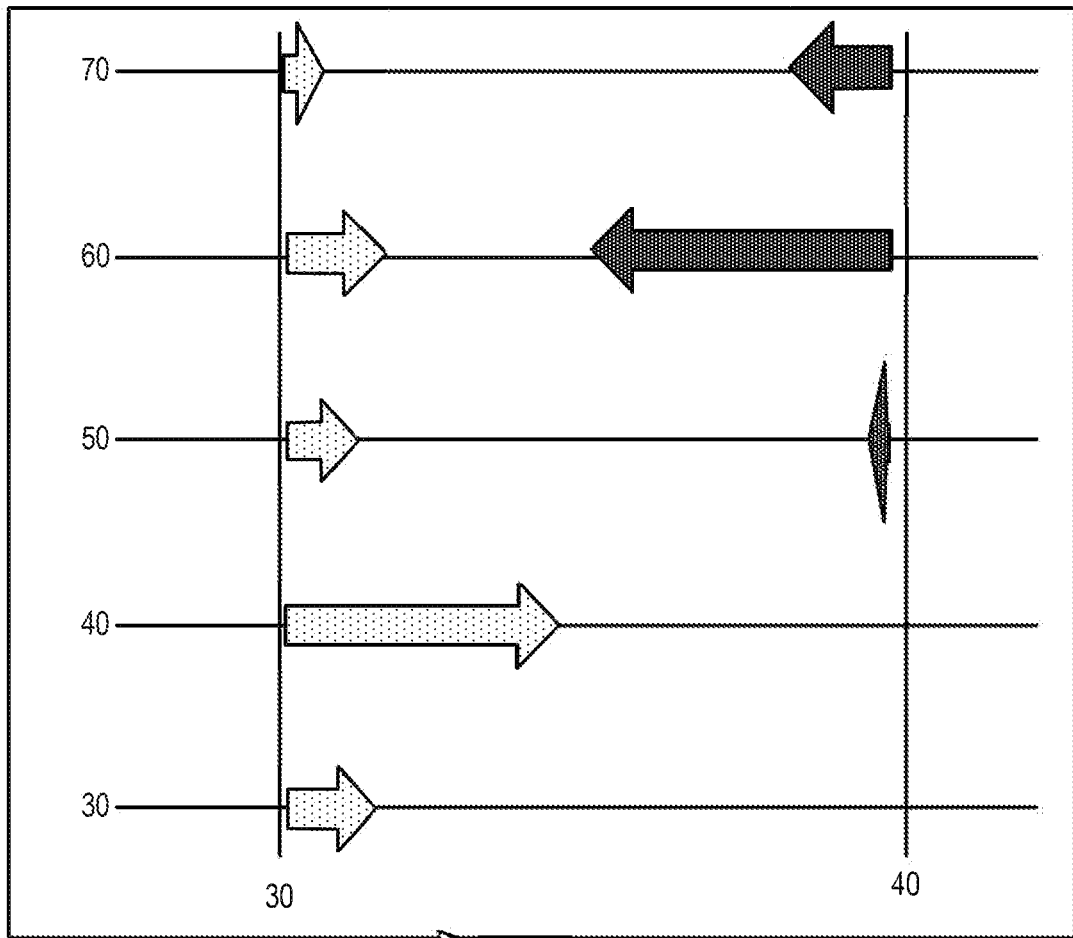
FIG. 18 illustrates crossing event data and user traffic of a third variation of a second simulation according to one embodiment.
Figure 18:
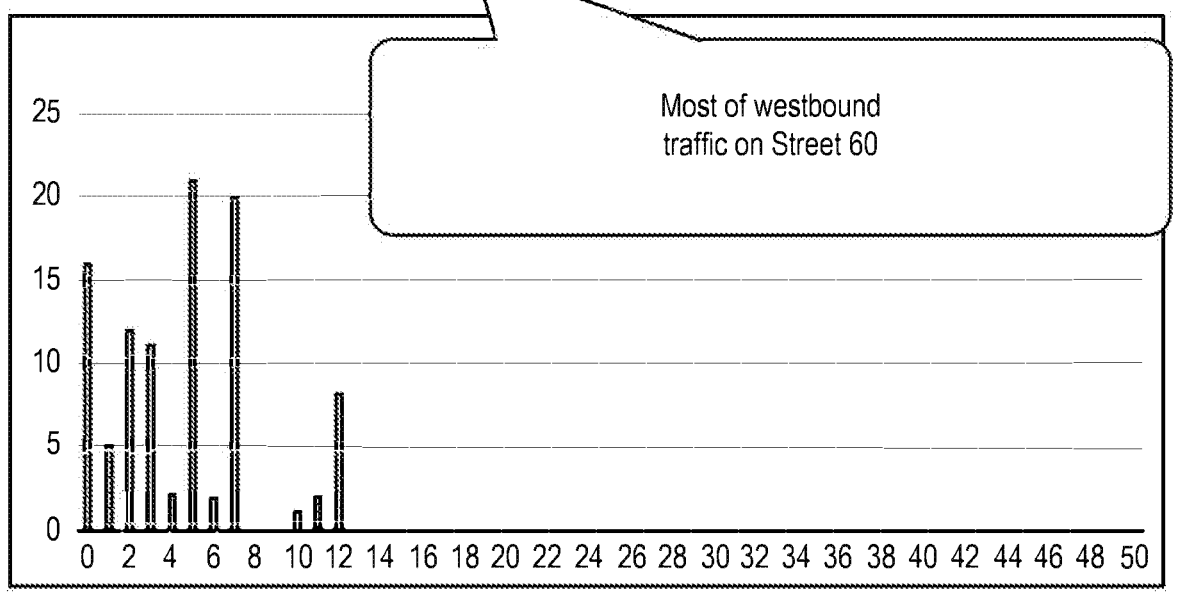

With reference to the simulation variation of FIG. 18, the crossing threshold value is reduced so that th=3. Significant improvement is observed with the simulation variation of FIG. 18 with the total number of crossings observed reduced to 455 from 1004 without learning features implemented.

Figure 19:
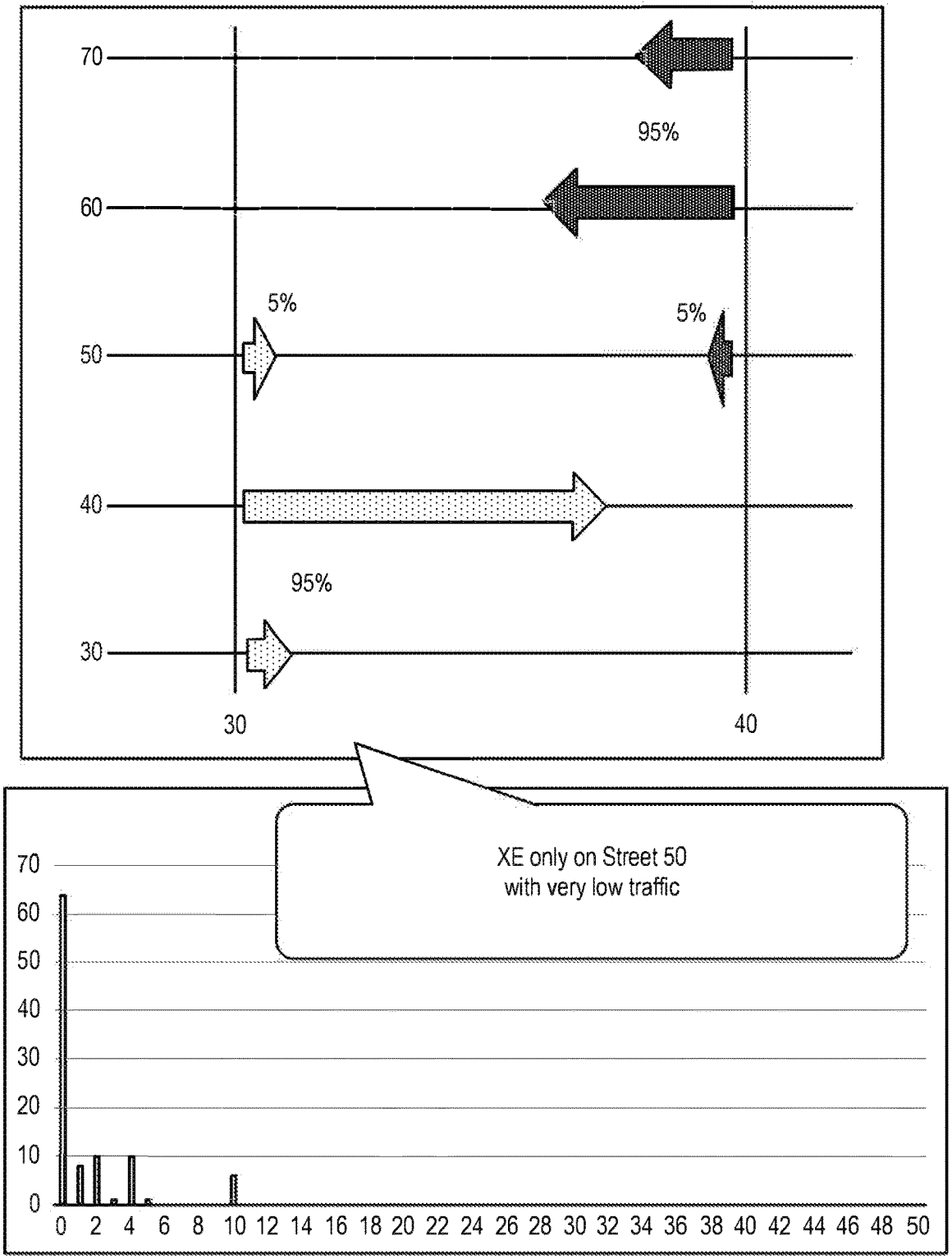
FIG. 19 illustrates crossing event data and user traffic of a fourth variation of a second simulation according to one embodiment.

FIG. 19 illustrates the simulation variation depicted in FIG. 18, with an optimization phase included wherein an initial route for a user can be selected to be the historical route of the user featuring the lowest aggregate, e.g., average number of crossings. Significant improvement is observed as shown in FIG. 19 when optimization phase features are implemented. Referring to FIG. 19, the overall number of crossings is reduced to 136 from 1004, defining an overall gain of about 7.4. With reference to the simulation variation of FIG. 19, it is seen that over iterations with an optimization phase implemented, users traveling generally in first and second opposite directions tend to assume routes dedicated for the respective different travel directions so that crossings can be avoided.

Figure 16:
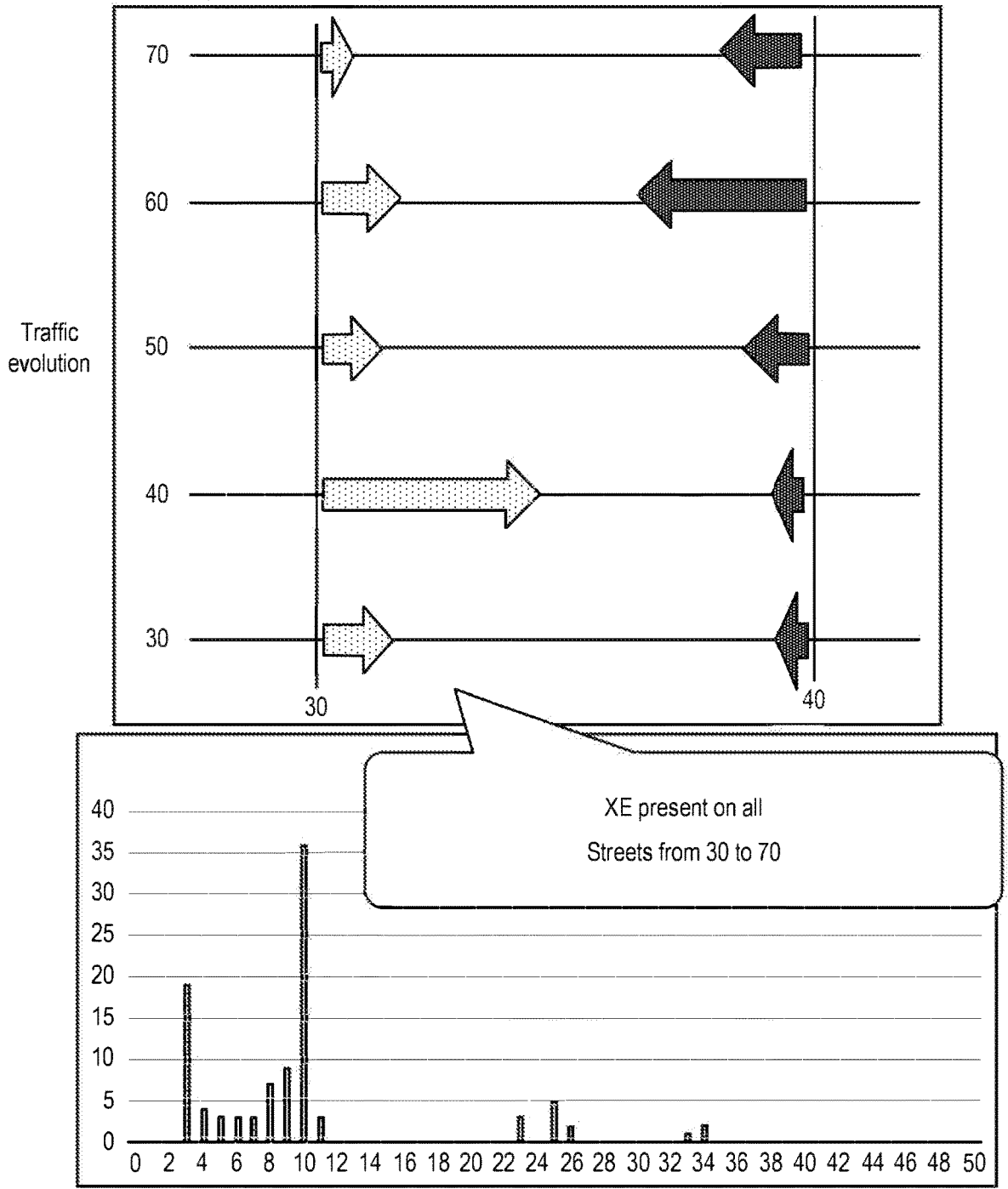
FIG. 16 illustrates crossing event data and user traffic of a first variation of a second simulation according to one embodiment.

Referring to the first simulation of FIG. 6-15, and the second simulation of FIG. 16-19, embodiments herein can produce a reduction of crossing events. With a learning phase active, in which a route for a trip can be dynamically altered within a trip based on detected crossings within the trip, the SDC application 211-216 can achieve a crossing reduction of about 1:2. With an optimization phase active, the SDC application 211-216 can achieve a greater reduction of crossings. Further, maximum crossing events can be greatly reduced. Further, there can be a significant increase of people without any crossing event being observed for a trip. In addition, the SDC application 211-216 can encourage traffic flow so that the streets become nearly entirely unidirectional (FIG. 19). Without the SDC application 211-216, all streets can experience two-way traffic (FIG. 16). With SDC application 211-216 learning phase active according to one simulation variation (FIG. 17) 2 streets out of 5 are one way. With the optimization phase of the SDC application 211-216 active according to one simulation variation (FIG. 19) a single street is two-way, with only 5% of the traffic.

Table B summarizes improvements observed with the first simulation of FIG. 6-15.

TABLE B

| Simulation Variation | Th (for triggering route adjustment) | Optimization phase | Maximum crossings, XEmax | Total Crossings, XEtotal | Median Crossings, XEmedian |
|---|---|---|---|---|---|
| 1 | inactive | inactive | 38 | 738 | 6 |
| 2 | 8 | inactive | 29 | 582 | 6 |
| 3 | 4 | inactive | 21 | 381 | 4 |
| 4 | 4 | active | 7 | 120 | 1 |

Table C summarizes improvements observed with the second simulation of FIG. 16-19.

TABLE C

| Simulation Variation | Th (for triggering route adjustment) | Optimization phase | Maximum crossings, XEmax | Total Crossings, XEtotal | Median Crossings, XEmedian |
|---|---|---|---|---|---|
| 1 | inactive | inactive | 34 | 1004 | 10 |
| 2 | 8 | inactive | 25 | 664 | 6 |
| 3 | 3 | inactive | 12 | 455 | 5 |
| 4 | 3 | active | 10 | 136 | 1 |

The described advantages can be achieved by UE devices behaving entirely independently, but under a commonly implemented configuration in which each respective UE device can independently (a) permit a user to declare a trip, (b) establish a route for the declared trip, (c) detect crossings associated to a route and trip, (d) alter a current route in response to collected crossings data, (e) prompt a user to travel a route, and (f) select a route in dependence on historical crossing data.

According to one embodiment of coordination process 112 optionally running on manager system 110, manager system 110 can examine coordinate locations of received reporting data sent at blocks 1211 to determine a region of service such as grid 5002 depicted in FIG. 5, and can iteratively run simulation variations with reference to the detected environment defined by grid 5002 under control by different control parameters, such as by providing different simulation variations by varying the crossing threshold, th, and trip threshold, Tth, parameter values. Manager system 110 can score the simulation variations under an applied one or more criterion and can select the control parameter values producing the highest scoring simulation variation, as the selected control parameter values, e.g., comprising crossing threshold, th, and trip threshold, Tth, parameter values for use in system 100. Applied one or more criterion can include e.g., lowest total number of crossings, lowest maximum crossing, lowest median number of crossings, as summarized in Tables B and C, or highest number of trips with zero detected crossings. Manager system 110 can send selected crossings threshold, th, and trip threshold, Tth, parameter values as part of iteratively sending and deploying software installation package updates at blocks 1102-1104.

According to one embodiment of coordination process 112 optionally running on manager system 110, manager system 110 as part of sending updated installation package data iteratively send at blocks 1102-1104 can be sending updated, e.g., Table A data on all users historical routes as can be reported iteratively by all UE devices 120A-120Z iteratively at blocks 1211. The historical route data can be anonymous route data that is absent of any data that associates an historical route to any particular route data. The historical route data from other users can be regarded to be crowdsourced route data. In such embodiment where crowdsourced historical route data is iteratively pushed to respective UE devices 120A-120Z, a UE device 120A at route selection block 1205 when ascertaining whether an historical trip has commencement and destination locations matching a declared route declared at block 1204, can examine the pushed crowdsourced historical data of remaining users as well as the historical data associated to the certain user of UE device 120A. With use of the described crowdsourced historical route data, satisfaction of the trip threshold, Tth, can be achieved more rapidly.

Figure 20:
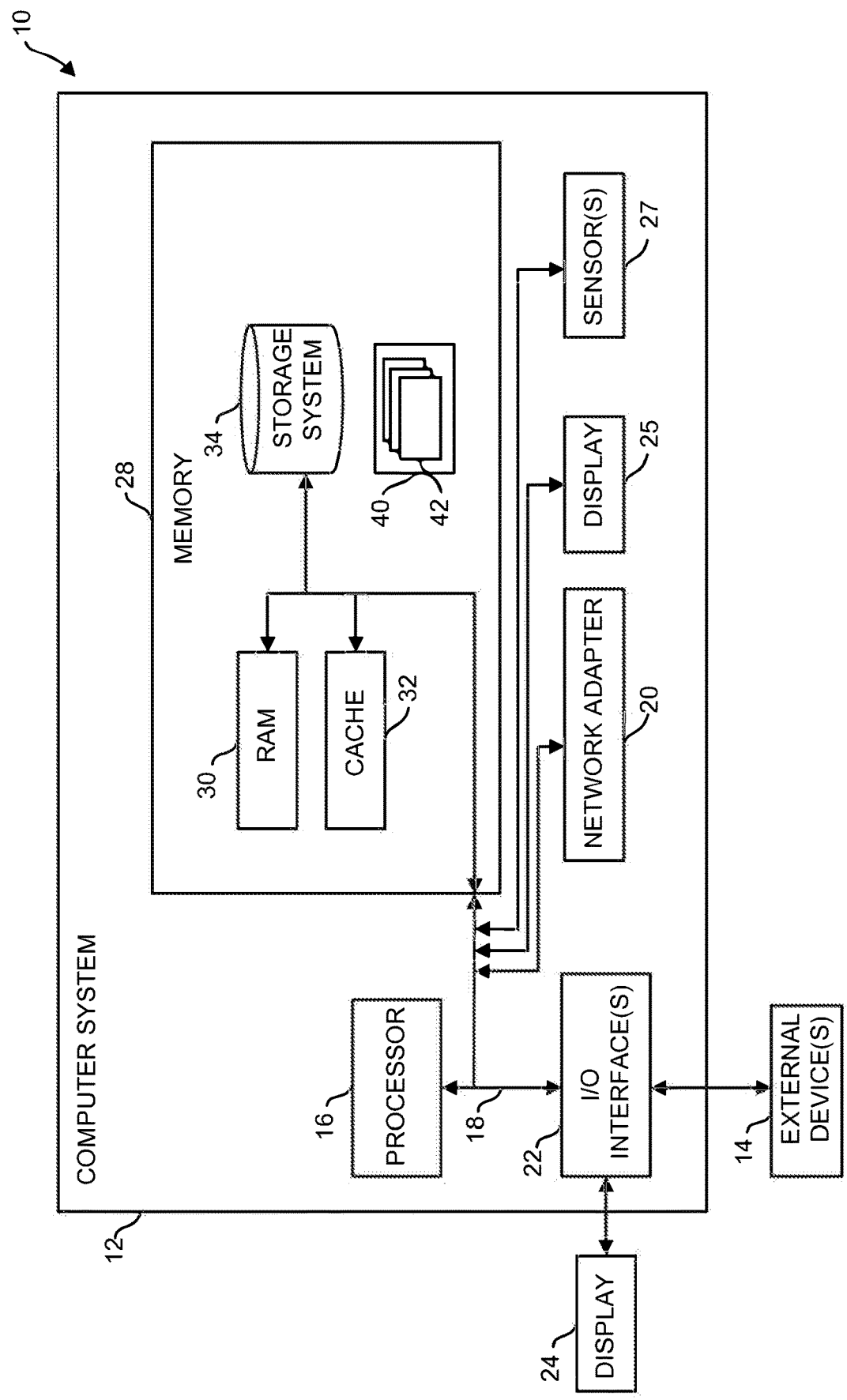
FIG. 20 depicts a computing node according to one embodiment.
Figure 21:
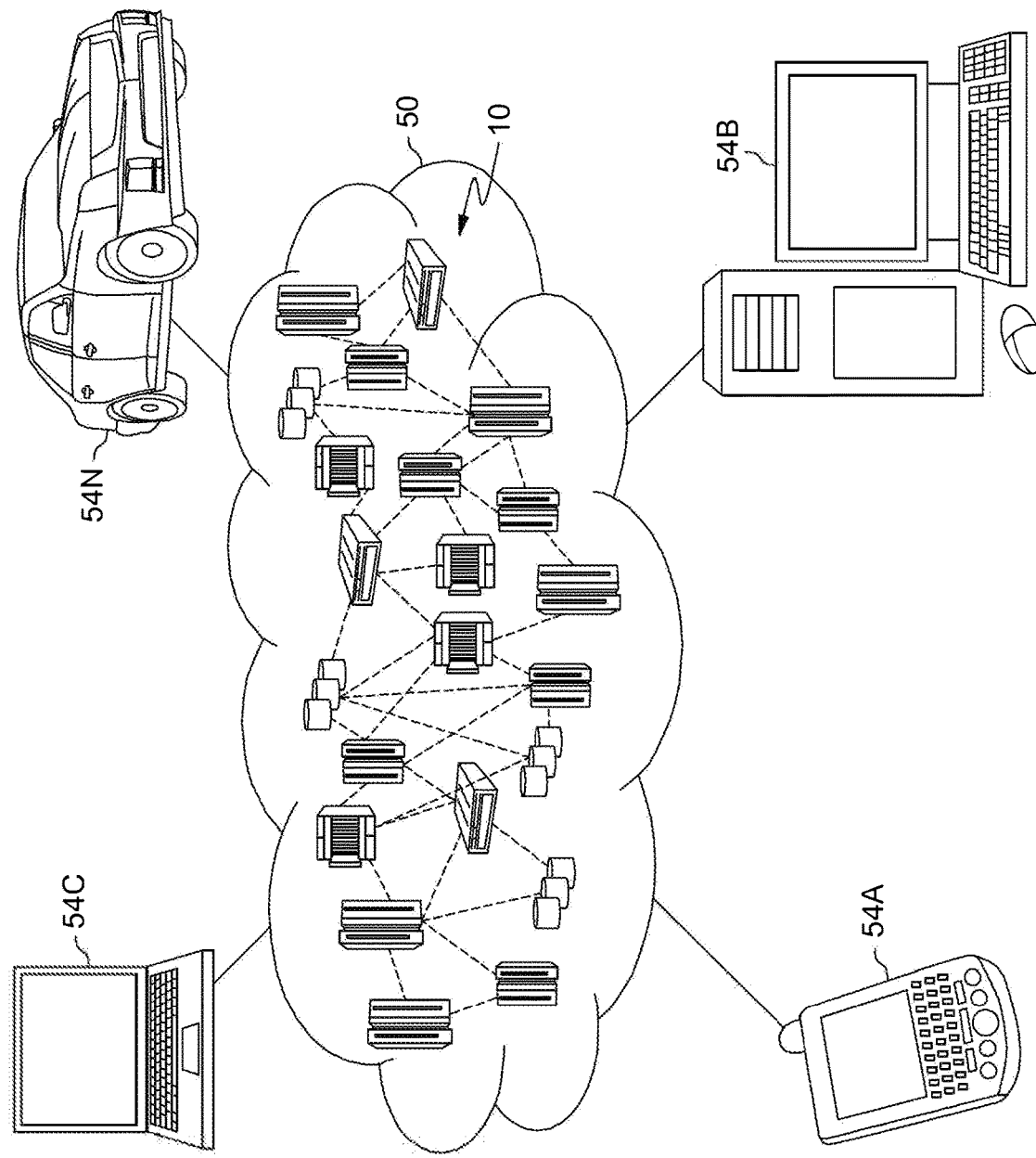
FIG. 21 depicts a cloud computing environment according to one embodiment.
Figure 22:
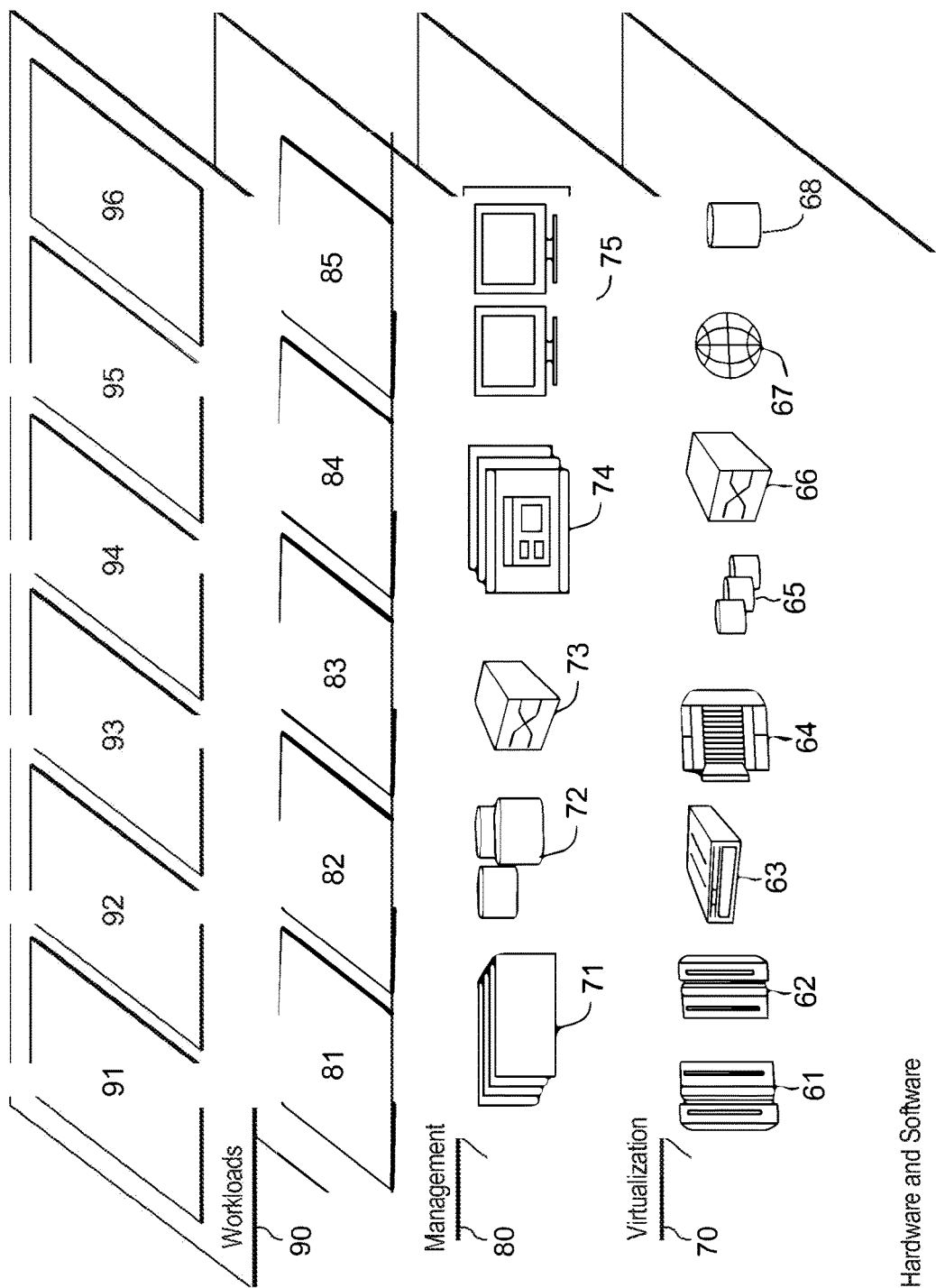
FIG. 22 depicts abstraction model layers according to one embodiment.

Certain embodiments herein may offer various technical computing advantages and practical applications involving computing advantages to address problems arising in the realm of computer systems and computer networks. Embodiments herein can include a distributed computing system in which separate UE devices operate independently yet cooperatively to produce a group benefit in terms of reduced crossing events. Embodiments herein provide for group social distancing, wherein for some embodiments, there is no exchange of any user specific data shared between a UE device and a central system or between the user device and another user device. According to one embodiment, a plurality of different viewing devices operated by a respective different users can have installed thereon respective instances of a common software installation package which provides a number of functions operable on the UE devices once the installation packages are installed. The functions can include, e.g., one or more of permitting the declaration of the trip by a user of the UE device, establishing of a selected route for the trip, the counting of crossing events, alteration of a current route for trip in dependence on a number of crossing events, prompting the travel along a selected route, or selecting of a route for a declared trip with use of history crossing event data associated to the declared trip. Crossing event detection can include examining of short range radio signals received from neighboring UE devices based on signal strength of neighboring of radio signals received from neighboring UE devices. According to one aspect, a group of independently functioning UE devices configured responsively to a common software installation package being installed on the respective UE devices can collaborate to reduce a risk of crossings by respective users of the UE devices. A fundamental aspect of operation of a computer system is its interoperation to which it operates including human actors. By increasing the accuracy and reliability of information presented to human users, embodiments herein increase the level of engagement of human users for enhanced computer system operation. Embodiments herein can feature a user interface of a mobile UE device that senses crossings of a user and which provides feedback to the user responsively. Embodiments herein can improve user privacy. For example, simplified software installation packages can be installed on UE devices without requirement of any personal user information. A federation of independently operating UE devices configured with the software installation packages installed can cooperate to safely guide users on selected routes without retrieval of any personal data or even of any trip data from the respective users UE devices. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making Embodiments herein can include particular arrangements for both collecting rich data into a data repository and additional particular arrangements for updating such data and for use of that data to drive artificial intelligence decision making Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription FIGS. 20-22 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 20, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 20, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 21-22.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to manager system 110 as set forth in the flowchart of FIG. 2. In one embodiment, one or more UE device 120A-120Z can include one or more computing node 10 and can include one or more program 40 for performing functions described with reference to a respective UE device of UE devices 120A-120Z as set forth in the flowchart of FIG. 2. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 21 computing node 10 is described as being implemented in a cloud computing environment and accordingly is referred to as a cloud computing node in the context of FIG. 21.

Referring now to FIG. 21, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 21 are intended to be illustrative only and that computing nodes 10 and cloud computing environment 50 can communicate with any type of computerized device over any type of network and/or network addressable connection (e.g., using a web browser).

Referring now to FIG. 22, a set of functional abstraction layers provided by cloud computing environment 50 (FIG. 21) is shown. It should be understood in advance that the components, layers, and functions shown in FIG. 22 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for social distancing route optimization as set forth herein. The processing components 96 can be implemented with use of one or more program 40 described in FIG. 20.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   receiving request data from a first mobile user equipment (UE) device, the request data requesting installation of an instance of a client software installation package on the first mobile UE device;
   responsively to the request data from the first mobile UE device, deploying a first instance of the client software installation package to the first mobile UE device for installation on the first mobile UE device, wherein the client software installation package is configured so that when the client software installation package is installed on a respective mobile client, the respective mobile client is operative for counting of crossings of the respective mobile client with one or more neighboring mobile client during performance of a trip, and selecting a route in dependence on the counting of crossings.

2. The computer implemented method of claim 1, including receiving request data from second to Nth mobile UE devices, the request data from second to Nth mobile UE devices requesting installation of respective second to Nth instances of the client software installation package on the second to Nth mobile UE devices, and responsively to the request data from the second to Nth mobile UE devices, deploying second to Nth instances of the client software installation package to the second to Nth mobile UE devices for installation on respective ones of the second to Nth mobile UE devices.

3. The computer implemented method of claim 1, wherein the client software installation package is configured so that when the client software installation package is installed on a respective mobile client, the respective mobile client is operative for (a) ascertaining that a trip has been declared by a respective mobile client user of the respective mobile client, the trip defined by a beginning location and a target location; (b) counting of crossings of the respective mobile client with one or more neighboring mobile client during performance of the trip; and (c) selecting a route for performance by the respective mobile client user in dependence on the counting of crossings, wherein the route selected by the selecting is a remainder of trip route from a current intermediate trip location to the target location of the trip.

4. The computer implemented method of claim 1, wherein the client software installation package is configured so that when the client software installation package is installed on a respective mobile client, the respective mobile client is operative for (a) ascertaining that a trip has been declared by a respective mobile client user of the respective mobile client, the trip defined by a beginning location and a target location; (b) counting of crossings of the respective mobile client with one or more neighboring mobile client during performance of the trip; and (c) selecting a route for performance by the respective mobile client user in dependence on the counting of crossings, wherein the route selected by the selecting is an initial route for a subsequent trip of the mobile client user occurring subsequently to the trip.

5. The computer implemented method of claim 1, wherein the client software installation package is configured so that when the client software installation package is installed on a respective mobile client, the respective mobile client is operative for (a) ascertaining that a trip has been declared by a respective mobile client user of the respective mobile client, the trip defined by a beginning location and a target location; (b) counting of crossings of the respective mobile client with one or more neighboring mobile client during performance of the trip; and (c) selecting a route for performance by the respective mobile client user in dependence on the counting of crossings, wherein the route selected by the selecting is a remainder of trip route from a current intermediate trip location to the target location of the trip, and wherein the selecting is performed responsively to a count of the crossings determined by the counting has satisfied a threshold.

6. The computer implemented method of claim 1, wherein the client software installation package is configured so that when the client software installation package is installed on a respective mobile client, the respective mobile client is operative for (a) ascertaining that a trip has been declared by a respective mobile client user of the respective mobile client, the trip defined by a beginning location and a target location; (b) counting of crossings of the respective mobile client with one or more neighboring mobile client during performance of the trip; and (c) selecting a route for performance by the respective mobile client user in dependence on the counting of crossings, wherein the route selected by the selecting is a remainder of trip route from a current intermediate trip location to the target location of the trip, and wherein the selecting is performed responsively to a count of the crossings by satisfying a threshold, wherein the counting includes classifying a first crossing event as an opposite direction crossing, classifying a second crossing event as a common direction crossing, assigning a first value to the first crossing event classified as an opposite direction crossing, and assigning a second value to the second crossing event classified as a common direction crossing, the second value lower than the first value.

7. The computer implemented method of claim 1, including receiving request data from second to Nth mobile UE devices, the request data from second to Nth mobile UE devices requesting installation of respective second to Nth instances of the client software installation package on the second to Nth mobile UE devices, and responsively to the request data from the second to Nth mobile UE devices, deploying second to Nth instances of the client software installation package to the second to Nth mobile UE devices for installation on respective ones of the second to Nth mobile UE devices, wherein the client software installation package is configured so that when the client software installation package is installed on a respective mobile client, the respective mobile client is operative for (a) ascertaining that a first trip has been declared by a respective mobile client user of the respective mobile client, the first trip having a commencement location and a target location, and responsively to the ascertaining establishing an initial route for the first trip; (b) counting of crossings of the respective mobile client with one or more neighboring mobile client during performance of the first trip; (c) selecting a route for performance by the respective mobile client user in dependence on the counting of crossings, wherein the selecting includes responsively to a count of crossings by the counting satisfying a threshold, selecting a remainder trip route for the respective mobile client for completion of the first trip from a current intermediate trip location of the mobile client to a destination location, (d) selecting a subsequent trip initial route responsively to the respective mobile client user declaring a subsequent trip having commencement location and destination location matching those of the first trip, the selecting the subsequent trip initial route includes selecting a performed route of the first trip responsively to a determination by examination of historical data that the performed route of the first trip produced a lowest aggregate number of detected crossings relative to other historical performed routes by the respective user for travel between the commencement location and the destination location, (e) prompting the respective mobile client user to perform the selected remainder trip route, and (f) prompting the mobile client user to perform the subsequent trip initial route.

8. The computer implemented method of claim 1, including receiving request data from second to Nth mobile UE devices, the request data from second to Nth mobile UE devices requesting installation of respective second to Nth instances of the client software installation package on the second to Nth mobile UE devices, and responsively to the request data from the second to Nth mobile UE devices, deploying second to Nth instances of the client software installation package to the second to Nth mobile UE devices for installation on respective ones of the second to Nth mobile UE devices, wherein the client software installation package is configured so that when the client software installation package is installed on a respective mobile client, the respective mobile client is operative for (a) ascertaining that a first trip has been declared by a respective mobile client user of the respective mobile client, the first trip having a commencement location and a target location, and responsively to the ascertaining establishing an initial route for the first trip; (b) counting of crossings of the respective mobile client with one or more neighboring mobile client during performance of the first trip, wherein the counting includes examining of a received radio signal stream received from the one or more neighboring mobile client, the examining being absent of demodulation of the received radio signal stream; (c) selecting a route for performance by the respective mobile client user in dependence on the counting of crossings, wherein the selecting includes responsively to a count of crossings by the counting satisfying a threshold, selecting a remainder trip route for the respective mobile client for completion of the first trip from a current intermediate trip location of the mobile client to a destination location, (d) selecting a subsequent trip initial route responsively to the respective mobile client user declaring a subsequent trip having commencement location and destination location matching those of the first trip, the selecting the subsequent trip initial route includes selecting a performed route of the first trip responsively to a determination by examination of historical data that the performed route of the first trip produced a lowest aggregate number of detected crossings relative to other historical performed routes by the respective user for travel between the commencement location and the destination location, (e) prompting the respective mobile client user to perform the selected remainder trip route, and (f) prompting the mobile client user to perform the subsequent trip initial route.

9. The computer implemented method of claim 1, wherein the counting includes examining of a radio signal stream received from the one or more neighboring mobile client.

10. The computer implemented method of claim 1, wherein the counting includes classifying a first crossing event as an opposite direction crossing, classifying a second crossing event as a common direction crossing, assigning a first value to the first crossing event classified as an opposite direction crossing, and assigning a second value to the second crossing event classified as a common direction crossing, the second value lower than the first value.

11. The computer implemented method of claim 1, wherein the counting includes examining of a radio signal stream received from the one or more neighboring mobile client, and ascertaining that a signal strength of the radio signal stream has satisfied a threshold.

12. The computer implemented method of claim 1, wherein the counting includes examining of a radio signal stream received from the one or more neighboring mobile client, and ascertaining that a signal strength of the radio signal stream has satisfied a threshold, wherein the counting includes examining of a radio signal stream received from the one or more neighboring mobile client, wherein the counting includes classifying a first crossing event as an opposite direction crossing, classifying a second crossing event as a common direction crossing, assigning a first value to the first crossing event classified as an opposite direction crossing, and assigning a second value to the second crossing event classified as a common direction crossing, the second value lower than the first value.

13. The computer implemented method of claim 1, wherein the counting includes examining of a radio signal stream received from the one or more neighboring mobile client, wherein the counting includes classifying a first crossing event as an opposite direction crossing, and classifying a second crossing event as a common direction crossing.

14. The computer implemented method of claim 1, wherein the counting includes classifying a first crossing event as an opposite direction crossing, and classifying a second crossing event as a common direction crossing.

15. The computer implemented method of claim 1, wherein the counting includes classifying a first crossing event as an opposite direction crossing.

16. The computer implemented method of claim 1, wherein the counting includes examining of a radio signal stream received from the one or more neighboring mobile client, wherein the counting includes classifying a first crossing event as an opposite direction crossing, and assigning a first value to the first crossing event in dependence on the classifying the first crossing event as an opposite direction crossing.

17. A system comprising:
a memory;
at least one processor in communication with the memory; and
program instructions executable by one or more processor via the memory to perform a method comprising:
receiving request data from a first mobile user equipment (UE) device, the request data requesting installation of an instance of a client software installation package on the first mobile UE device;
responsively to the request data from the first mobile UE device, deploying a first instance of the client software installation package to the first mobile UE device for installation on the first mobile UE device, wherein the client software installation package is configured so that when the client software installation package is installed on a respective mobile client, the respective mobile client is operative for counting of crossings of the respective mobile client with one or more neighboring mobile client during performance of a trip, and selecting a route in dependence on the counting of crossings.

18. A computer implemented method comprising:
(a) ascertaining that a trip has been declared by a mobile client user of a mobile client;
(b) counting of crossings of the mobile client with one or more neighboring mobile client during performance of the trip; and
(c) selecting a route for performance by the mobile client user in dependence on the counting of crossings, wherein the counting includes examining of a radio signal stream received from the one or more neighboring mobile client.

19. The computer implemented method of claim 18, wherein the counting includes classifying a first crossing event as an opposite direction crossing, classifying a second crossing event as a common direction crossing, assigning a first value to the first crossing event classified as an opposite direction crossing, and assigning a second value to the second crossing event classified as a common direction crossing, the second value lower than the first value.

20. The computer implemented method of claim 18, wherein the counting includes determining a direction of crossing.

\* \* \* \* \*